US012415363B2

(12) United States Patent
Hagiwara et al.

(10) Patent No.: US 12,415,363 B2
(45) **Date of Patent: *Sep. 16, 2025**

(54) LIQUID EJECTING APPARATUS AND FILLING METHOD

(71) Applicant: SEIKO EPSON CORPORATION, Tokyo (JP)

(72) Inventors: Hiroyuki Hagiwara, Matsumoto (JP); Shun Katsuie, Matsumoto (JP); Hidenori Sokabe, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 153 days.

This patent is subject to a terminal disclaimer.

(21) Appl. No.: 18/364,683

(22) Filed: Aug. 3, 2023

(65) Prior Publication Data

US 2024/0042772 A1 Feb. 8, 2024

(30) Foreign Application Priority Data

Aug. 4, 2022 (JP) ................................ 2022-124596

(51) Int. Cl.

*B41J 2/175* (2006.01)
*B41J 2/18* (2006.01)
*B41J 2/19* (2006.01)

(52) U.S. Cl.

CPC ............ *B41J 2/17563* (2013.01); *B41J 2/18* (2013.01); *B41J 2/19* (2013.01); *B41J 2202/07* (2013.01)

(58) Field of Classification Search

CPC ............... B41J 2/14201; B41J 2/14233; B41J 2/17563; B41J 2/18; B41J 2/19; B41J 2202/07

See application file for complete search history.

(56) References Cited

U.S. PATENT DOCUMENTS

| | | | | |
|---|---|---|---|---|
| 11,247,460 B2 * | 2/2022 | Sugiura | ................ | B41J 2/14233 |
| 11,673,400 B2 * | 6/2023 | Moriyama | ........... | B41J 2/17506 347/93 |
| 2024/0042771 A1 * | 2/2024 | Sokabe | ................ | B41J 2/17563 |

FOREIGN PATENT DOCUMENTS

| | | |
|---|---|---|
| JP | 2017-217612 A | 12/2017 |
| JP | 2021-187003 A | 12/2021 |

* cited by examiner

*Primary Examiner* — Geoffrey S Mruk

(74) *Attorney, Agent, or Firm* — Harness, Dickey & Pierce, P.L.C.

(57) ABSTRACT

A liquid ejecting apparatus includes a filter that partitions a common liquid chamber communicating with a nozzles into an upstream chamber and a downstream chamber, an inlet, an outlet, a liquid storage section, a supply flow path, and a recovery flow path. A beam portion is provided inside the downstream chamber. A pressurization discharge operation for discharging the liquid from the nozzles and a circulation operation for circulating the liquid in a circulation path are performed. In the filling process of filling the circulation path with the liquid, after the first circulation operation is performed, a predetermined operation for moving the liquid inside the downstream chamber in a direction different from a direction in which the liquid inside the downstream chamber is moved by the circulation operation is performed, and thereafter, the pressurization discharge operation is performed.

7 Claims, 25 Drawing Sheets

LIQUID EJECTING APPARATUS AND FILLING METHOD

The present application is based on, and claims priority from JP Application Serial Number 2022-124596, filed Aug. 4, 2022, the disclosure of which is hereby incorporated by reference herein in its entirety.

BACKGROUND

1. Technical Field

The present disclosure relates to a liquid ejecting apparatus and a filling method.

2. Related Art

In the related art, a liquid ejecting apparatus for ejecting a liquid such as an ink from a plurality of nozzles is known. For example, JP-A-2017-217612 discloses a liquid ejecting apparatus including a liquid storage section capable of storing a liquid, a common liquid chamber communicating with a plurality of nozzles, a supply flow path for supplying the liquid from the liquid storage section to the common liquid chamber, and a recovery flow path for recovering the liquid from the common liquid chamber to the liquid storage section. The common liquid chamber of the liquid ejecting apparatus disclosed in JP-A-2017-217612 is partitioned into an upstream chamber and a downstream chamber by a filter. The upstream chamber is provided with an inlet for communicating with the recovery flow path and introducing the liquid into the upstream chamber, and an outlet for communicating with the recovery flow path and causing the liquid to flow out.

In addition, JP-A-2021-187003 discloses a liquid ejecting apparatus including a liquid storage section, a liquid ejecting head having a plurality of nozzles, a supply flow path for supplying a liquid from the liquid storage section to the liquid ejecting head, and a recovery flow path for recovering the liquid from the liquid ejecting head, in which the liquid is circulated between the liquid storage section and the liquid ejecting head. The liquid ejecting apparatus disclosed in JP-A-2021-187003 has an on-off valve capable of opening and closing the recovery flow path. Furthermore, in JP-A-2021-187003, in a filling process of filling the supply flow path, the recovery flow path, and the liquid ejecting head with the liquid, a circulation operation is performed to circulate the liquid in a state where the recovery flow path is opened by the on-off valve. Thereafter, a pressurization discharge operation is performed to discharge the liquid from the liquid ejecting head by causing the on-off valve to close the recovery flow path.

In the liquid ejecting head disclosed in JP-A-2017-217612, it is conceivable that a beam portion extending in a direction intersecting with a direction in which the liquid flows from an inlet to a discharge port inside the common liquid chamber is provided in a flow path member forming the downstream chamber. In a case where the liquid ejecting head disclosed in JP-A-2017-217612 has the beam portion, when the filling process disclosed in JP-A-2021-187003 is performed, in some cases, air bubbles may stay between the filter and the beam portion due to the circulation operation.

SUMMARY

According to a preferred aspect of the present disclosure, there is provided a liquid ejecting apparatus including a plurality of nozzles that eject a liquid in an ejection direction, a common liquid chamber that communicates with the plurality of nozzles and extends in a first direction orthogonal to the ejection direction, a filter that partitions the common liquid chamber into an upstream chamber and a downstream chamber, an inlet for introducing the liquid into the upstream chamber, an outlet for causing the liquid to flow out from the upstream chamber, a liquid storage section configured to store the liquid, a supply flow path that causes the inlet to communicate with the liquid storage section, and a recovery flow path that causes the outlet to communicate with the liquid storage section. A beam portion that couples a pair of inner walls for defining the downstream chamber is provided inside the downstream chamber. The pair of inner walls are separated in a direction intersecting with the first direction when viewed in the ejection direction. A pressurization discharge operation for discharging the liquid from the plurality of nozzles by pressurizing the supply flow path and a first circulation operation for circulating the liquid in a circulation path including the liquid storage section, the supply flow path, the common liquid chamber, and the recovery flow path, in order of the liquid storage section, the supply flow path, the common liquid chamber, the recovery flow path, and the liquid storage section are performed. In a filling process of filling the circulation path with the liquid, after the first circulation operation is performed, a predetermined operation for moving the liquid inside the downstream chamber in a direction different from a direction in which the liquid inside the downstream chamber is moved by the first circulation operation is performed, and after the predetermined operation is performed, the pressurization discharge operation is performed.

According to another preferred aspect of the present disclosure, there is provided a filling method for a liquid ejecting apparatus including a plurality of nozzles that eject a liquid in an ejection direction, a common liquid chamber that communicates with the plurality of nozzles and extends in a first direction orthogonal to the ejection direction, a filter that partitions the common liquid chamber into an upstream chamber and a downstream chamber, an inlet for introducing the liquid into the upstream chamber, an outlet for causing the liquid to flow out from the upstream chamber, a liquid storage section configured to store the liquid, a supply flow path that causes the inlet to communicate with the liquid storage section, and a recovery flow path that causes the outlet to communicate with the liquid storage section. A beam portion that couples a pair of inner walls for defining the downstream chamber is provided inside the downstream chamber, the pair of inner walls are separated in a direction intersecting with the first direction when viewed in the ejection direction, a pressurization discharge operation for discharging the liquid from the plurality of nozzles by pressurizing the supply flow path and a first circulation operation for circulating the liquid in a circulation path including the liquid storage section, the supply flow path, the common liquid chamber, and the recovery flow path, in order of the liquid storage section, the supply flow path, the common liquid chamber, the recovery flow path, and the liquid storage section are performed. The filling method includes performing a filling process of filling the circulation path with the liquid, in which after the first circulation operation is performed, a predetermined operation for moving the liquid inside the downstream chamber in a direction different from a direction in which the liquid inside the downstream chamber is moved by the first circulation operation is performed, and after the predetermined operation is performed, the pressurization discharge operation is performed.

DESCRIPTION OF EMBODIMENTS

1. First Embodiment

Hereinafter, an embodiment for carrying out the present disclosure will be described with reference to the drawings. However, in each drawing, a dimension and a scale of each portion are appropriately different from actual ones. In addition, although the embodiment described below is a preferred specific example of the present disclosure, and thus, various technically preferable limitations are imposed. However, the scope of the present disclosure is not limited to these forms unless there is a description to such an effect that the present disclosure is particularly limited in the following description.

For the sake of convenience, the following description will be made by appropriately using an X-axis, a Y-axis, and a Z-axis which intersect with each other. In addition, in the following description, one direction along the X-axis is an X1-direction, and a direction opposite to the X1-direction is an X2-direction. Similarly, mutually opposite directions along the Y-axis are a Y1-direction and a Y2-direction. In addition, mutually opposite directions along the Z-axis are a Z1-direction and a Z2-direction. In addition, viewing in a Z-axis direction may be simply referred to as a "plan view" in some cases. The Z2-direction is an example of an "ejection direction". The Y1-direction or the Y2-direction is an example of a "first direction". The X1-direction or the X2-direction is an example of a "third direction".

Here, typically, the Z-axis is a vertical axis, and in a first embodiment, the Z2-direction coincides with a gravity direction GV. In addition, the X-axis, the Y-axis, and the Z-axis are orthogonal to each other.

1-1. Schematic Configuration of Liquid Ejecting Apparatus

Figure 1:
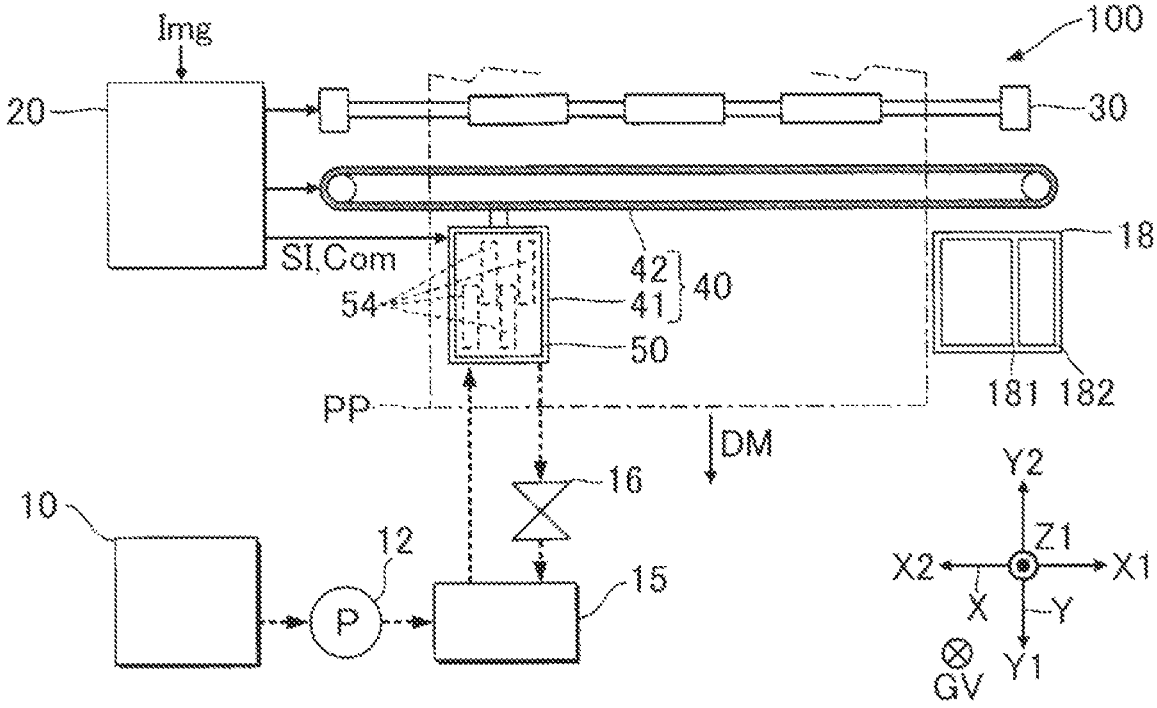
FIG. 1 is a schematic view illustrating an example of a liquid ejecting apparatus according to a first embodiment.

FIG. 1 is a schematic view illustrating an example of a liquid ejecting apparatus 100 according to the first embodiment. The liquid ejecting apparatus 100 is an ink jet printing apparatus that ejects an ink which is an example of a "liquid" onto a medium PP as a droplet. For example, the liquid ejecting apparatus 100 has a substantially box shape, and is mounted on a mounting surface orthogonal to the gravity direction GV. The medium PP is typically a printing paper. The medium PP is not limited to the printing paper, and for example, may be a printing target formed of any material such as a resin film or a fabric.

As illustrated in FIG. 1, the liquid ejecting apparatus 100 has a main tank 10, a pump 12, a circulation mechanism 15, an on-off valve 16, a maintenance mechanism 18, a control module 20, a transport mechanism 30, a moving mechanism 40, and a liquid ejecting head 50.

The main tank 10 is a container for storing the ink. For example, specific aspects of the main tank 10 include a cartridge attachable to and detachable from the liquid ejecting apparatus 100, a bag-shaped ink pack formed of a flexible film, and a container such as an ink-refillable ink tank.

Although not illustrated, the main tank 10 has a plurality of containers that store mutually different types of the ink. Although the ink stored in the plurality of containers are not particularly limited, for example, the ink includes a cyan ink, a magenta ink, a yellow ink, a black ink, a clear ink, a white ink, and a treatment liquid, and combinations of two or more types of these ink may be used. Each of the ink is not particularly limited in composition. For example, the ink may be a water-based ink in which a coloring material such as a dye and a pigment is dissolved in a water-based solvent, a solvent-based ink in which the coloring material is dissolved in an organic solvent, or an ultraviolet-curable ink.

As an example, the present embodiment adopts a configuration in which four mutually different types of the ink are used. For example, the four types of the ink are mutually different color ink such as the cyan ink, the magenta ink, the yellow ink, and the black ink.

The control module 20 controls an operation of each element of the liquid ejecting apparatus 100. For example, the control module 20 includes a processing circuit such as a CPU and an FPGA, and a memory circuit such as a semiconductor memory. The CPU is an abbreviation for central processing unit. The FPGA is an abbreviation for field programmable gate array. The control module 20 outputs a drive signal Com and a control signal SI toward the liquid ejecting head 50. The drive signal Com is a signal including a drive pulse for driving a drive element of the liquid ejecting head 50. The control signal SI is a signal for designating whether or not to supply the drive signal Com to the drive element.

The transport mechanism 30 transports the medium PP in a transport direction DM which is the Y1-direction, under the control of the control module 20. The moving mechanism 40 causes the liquid ejecting head 50 to reciprocate in the X1-direction and the X2-direction under the control of the control module 20. In an example illustrated in FIG. 1, the moving mechanism 40 has a substantially box-shaped support body 41 called a carriage that accommodates the liquid ejecting head 50, and a transport belt 42 to which the support body 41 is fixed. In addition to the liquid ejecting head 50, the above-described main tank 10 may be mounted on the support body 41.

The liquid ejecting head 50 has a plurality of head chips 54 as will be described later and, under the control of the control module 20, the ink supplied from the main tank 10 is ejected from each of a plurality of nozzles N of each head chip 54 toward the medium PP in the Z2-direction which is the ejection direction. In the liquid ejecting apparatus 100, the ink is ejected in parallel when the medium PP is transported by the transport mechanism 30 and the liquid ejecting head 50 is caused to reciprocate by the moving mechanism 40, based on image data Img supplied from a host computer such as a personal computer and a digital camera. In this manner, a printing operation for forming an image indicated by the image data Img on a surface of the medium PP is performed.

The maintenance mechanism 18 is a mechanism for performing a maintenance operation for maintaining the liquid ejecting head 50. The maintenance mechanism 18 is provided in a region that does not overlap the medium PP when viewed in the direction along the Z-axis. The maintenance mechanism 18 includes a cap 181 and a liquid receiving section 182. The cap 181 is a substantially box-shaped structure that opens in the Z2-direction. The cap 181 seals the plurality of nozzles N by covering an ejection surface on which the plurality of nozzles N are formed. The liquid receiving section 182 is a substantially box-shaped tank that opens in the Z2-direction. The liquid receiving section 182 is used to receive the ink ejected from the nozzle N. The liquid receiving section 182 may be configured in a substantially box shape as in the cap 181.

For example, the maintenance operation includes a flushing operation. The flushing operation is an operation for forcibly ejecting the ink that does not directly contribute to image formation from the plurality of nozzles N by driving a piezoelectric element 54*f* (to be described later). The ink that does not directly contribute to the image formation means that the ink does not form the image itself formed on the surface of the medium PP by the printing operation. In the flushing operation, the ink is ejected to the liquid receiving section 182.

The main tank 10 is coupled to the liquid ejecting head 50 via the circulation mechanism 15. The circulation mechanism 15 is a mechanism that supplies the ink to each of the plurality of liquid ejecting heads 50 under the control of the control module 20, and recovers the ink discharged from each of the plurality of liquid ejecting heads 50 to resupply the ink to the liquid ejecting head 50. The circulation mechanism 15 and the on-off valve 16 are provided for each of the mutually different types of the ink. The circulation mechanism 15 and the on-off valve 16 will be described with reference to FIG. 2.

1-2. Circulation Mechanism 15 and On-Off Valve 16

Figure 2:
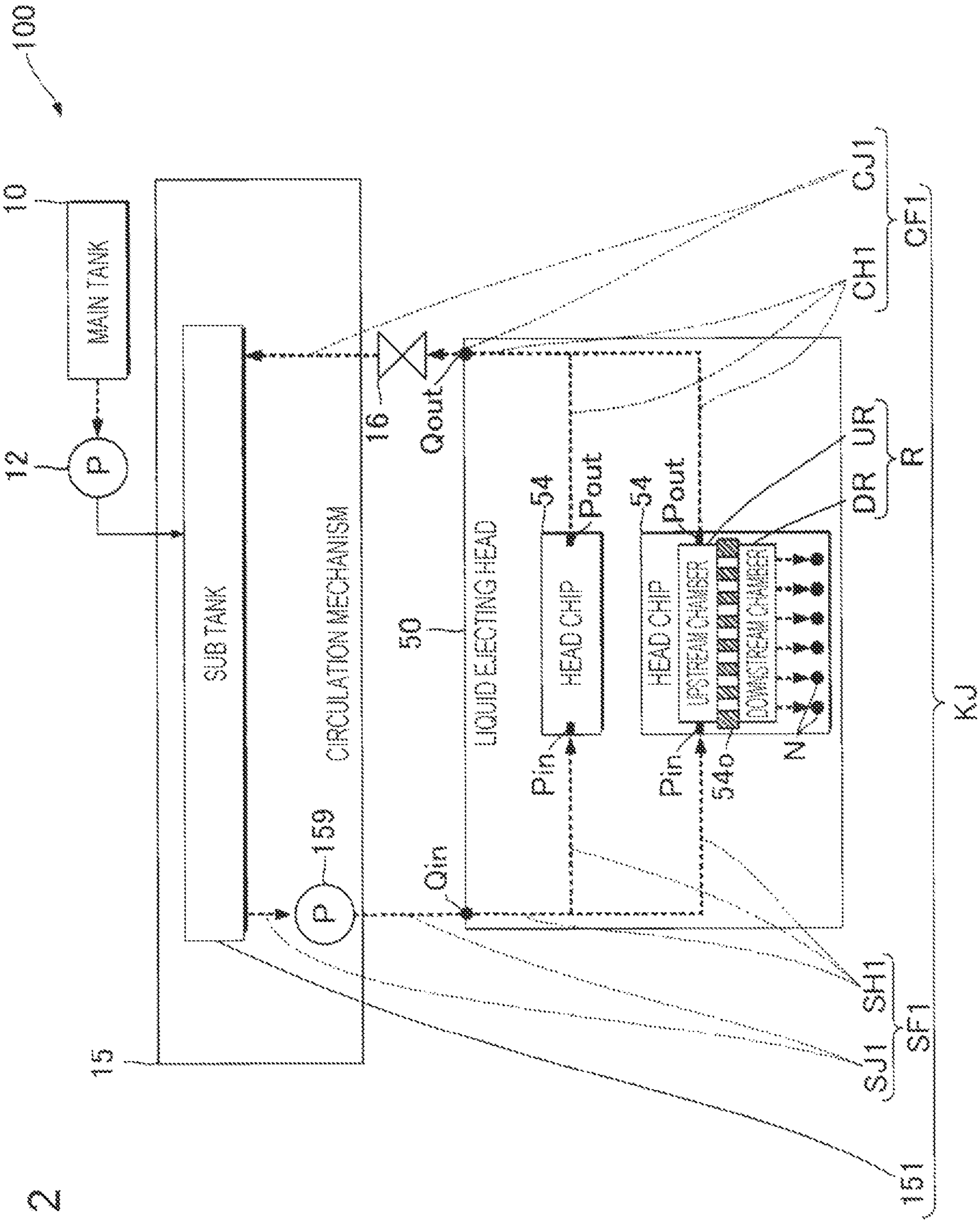
FIG. 2 is a view for describing a circulation mechanism and an on-off valve.

FIG. 2 is a view for describing the circulation mechanism 15 and the on-off valve 16. As illustrated in FIG. 2, the circulation mechanism 15 includes a sub tank 151 and a pump 159. In FIG. 2, any one type of the ink in the plurality of types of the ink will be described. FIG. 2 illustrates only two head chips 54 to which one type of the ink is supplied in the plurality of head chips 54 so that the drawing is not complicated. Furthermore, FIG. 2 illustrates the inside of only one head chip 54 in the two head chips 54 so that the drawing is not complicated.

The sub tank 151 is coupled to a supply flow path SF1 and a recovery flow path CF1, and stores the ink to be supplied to the plurality of liquid ejecting heads 50. The sub tank 151 stores the ink to be supplied to the liquid ejecting head 50, the ink recovered from the liquid ejecting head 50, and the ink supplemented from the main tank 10. The sub tank 151 is an example of a "liquid storage section".

The supply flow path SF1 causes an inlet Pin for introducing the ink into the head chip 54 to communicate with the sub tank 151. The supply flow path SF1 has an in-device supply flow path SJ1 and an in-head supply flow path SH1. The in-device supply flow path SJ1 is a flow path provided outside the liquid ejecting head 50, is coupled to the sub tank 151, and communicates with a head inlet Qin for introducing the ink into the liquid ejecting head 50. The in-head supply flow path SH1 is a flow path provided inside the liquid ejecting head 50, and supplies the ink to each of the plurality of head chips 54. The in-head supply flow path SH1 has a mainstream portion coupled to the in-device supply flow path SJ1 and a plurality of branch portions branched from the mainstream portion for each of the plurality of head chips 54. In the present embodiment, an example in which the main tank 10 is provided for each of four types of the ink and one type of the ink is supplied to two head chips 54 as illustrated in FIG. 2 will be described. Furthermore, it is assumed that two types of the ink can be supplied to one head chip 54. However, the liquid ejecting head 50 may supply any one type of the ink to three or more head chips 54 or may supply any one type of the ink to one head chip 54.

The recovery flow path CF1 causes an outlet Pout for causing the ink to flow out from the head chip 54 to communicate with the sub tank 151. The recovery flow path CF1 has an in-device recovery flow path CJ1 and an in-head recovery flow path CH1. The in-device recovery flow path CJ1 is a flow path provided outside the liquid ejecting head

50, is coupled to the sub tank 151, and communicates with a head outlet Qout for causing the ink to flow out from the liquid ejecting head 50. The in-head recovery flow path CH1 is a flow path provided inside the liquid ejecting head 50, and recovers the ink from each of the plurality of head chips 54. The in-head recovery flow path CH1 has a mainstream portion coupled to the in-device recovery flow path CJ1 and a plurality of branch portions for coupling the mainstream portion and each of the plurality of head chips 54.

The on-off valve 16 is provided in an intermediate portion of the in-device recovery flow path CJ1. The on-off valve 16 can close and open the in-device recovery flow path CJ1 under the control of the control module 20. In the following description, closing the in-device recovery flow path CJ1 by the on-off valve 16 may be referred to as "closing the on-off valve 16", and opening the in-device recovery flow path CJ1 by the on-off valve 16 may be referred to as "opening the on-off valve 16". A device other than the control module 20 may control the on-off valve 16. The on-off valve 16 may be any valve as long as the valve can be controlled from a device such as the control module 20, and for example, the valve may be a diaphragm valve, an electromagnetic valve, or an electric valve.

In the present embodiment, the on-off valve 16 is provided in the intermediate portion of the in-device recovery flow path CJ1. However, the on-off valve 16 may be provided in the intermediate portion of the mainstream portion of the in-head recovery flow path CH1. Alternatively, a plurality of the on-off valves 16 may be provided in the intermediate portion of each of the plurality of branch portions of the in-head recovery flow path CH1.

The pump 159 is provided in the intermediate portion of the in-device supply flow path SJ1. The pump 159 causes a first ink of the sub tank 151 to flow to the liquid ejecting head 50 under the control of the control module 20.

The head chip 54 is provided with a common liquid chamber R that communicates with the plurality of nozzles N. The common liquid chamber R is partitioned into an upstream chamber UR and a downstream chamber DR by a filter 54*o*. As illustrated in FIG. 2, the inlet Pin and the outlet Pout are provided in the upstream chamber UR. The plurality of nozzles N communicate with the downstream chamber DR. Internal elements of the head chip 54 will be described later with reference to FIGS. 5, 6, and 7.

As described above, the liquid ejecting apparatus 100 has a circulation path KJ having the sub tank 151, the supply flow path SF1, the common liquid chamber R, and the recovery flow path CF1. Under an instruction of the control module 20, the liquid ejecting apparatus 100 can perform a first circulation operation for circulating the ink in the circulation path KJ in order of the sub tank 151, the supply flow path SF1, the common liquid chamber R, the recovery flow path CF1, and the sub tank 151.

In addition, when the ink is ejected from the nozzle N, the amount of the ink in the sub tank 151 is reduced. Therefore, the pump 12 appropriately supplements the ink of the sub tank 151 by supplying the ink from the main tank 10 to the sub tank 151 under the control of the control module 20. For example, at a timing for supplementing the ink of the sub tank 151, the ink is supplemented when a height of the ink of the sub tank 151 is lower than a predetermined height.

1-3. Attachment State of Liquid Ejecting Head 50

Figure 3:
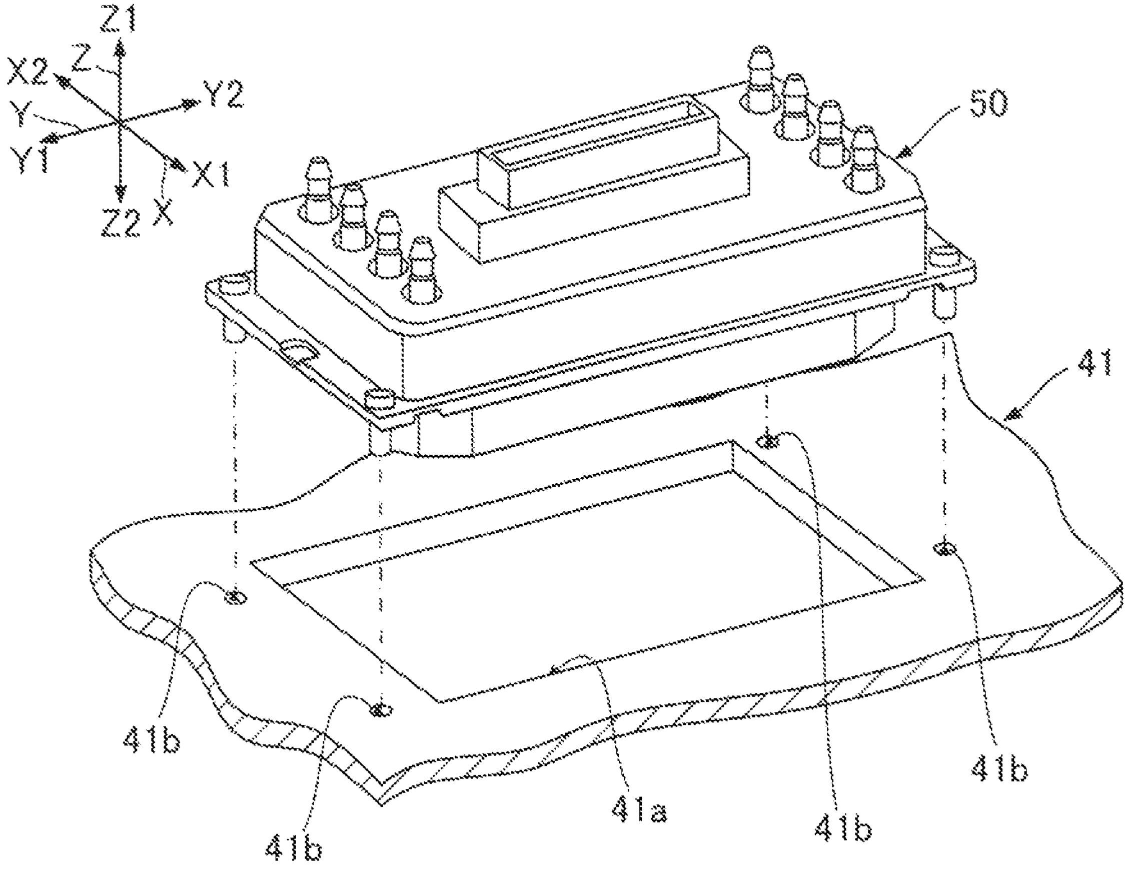
FIG. 3 is a perspective view of a liquid ejecting head and a support body according to the first embodiment.

FIG. 3 is a perspective view of the liquid ejecting head 50 and the support body 41 according to the first embodiment. As illustrated in FIG. 3, the liquid ejecting head 50 is supported by the support body 41. The support body 41 is a member that supports the liquid ejecting head 50 and, as described above, the support body 41 is a substantially box-shaped carriage in the present embodiment.

Here, the support body 41 is provided with an opening 41*a* and a plurality of screw holes 41*b*. In the present embodiment, the support body 41 has a substantially box shape with a plate-shaped bottom portion. For example, the bottom portion is provided with the opening 41*a* and the plurality of screw holes 41*b*. The liquid ejecting head 50 is fixed to the support body 41 by screwing using the plurality of screw holes 41*b* in a state of being inserted into the opening 41*a*. As described above, the liquid ejecting head 50 is attached to the support body 41.

In an example illustrated in FIG. 3, one liquid ejecting head 50 is attached to the support body 41. Two or more liquid ejecting heads 50 may be attached to the support body 41. In this case, for example, the support body 41 is appropriately provided with the openings 41*a* corresponding to the numbers or shapes of the liquid ejecting heads 50.

1-4. Configuration of Liquid Ejecting Head

Figure 4:
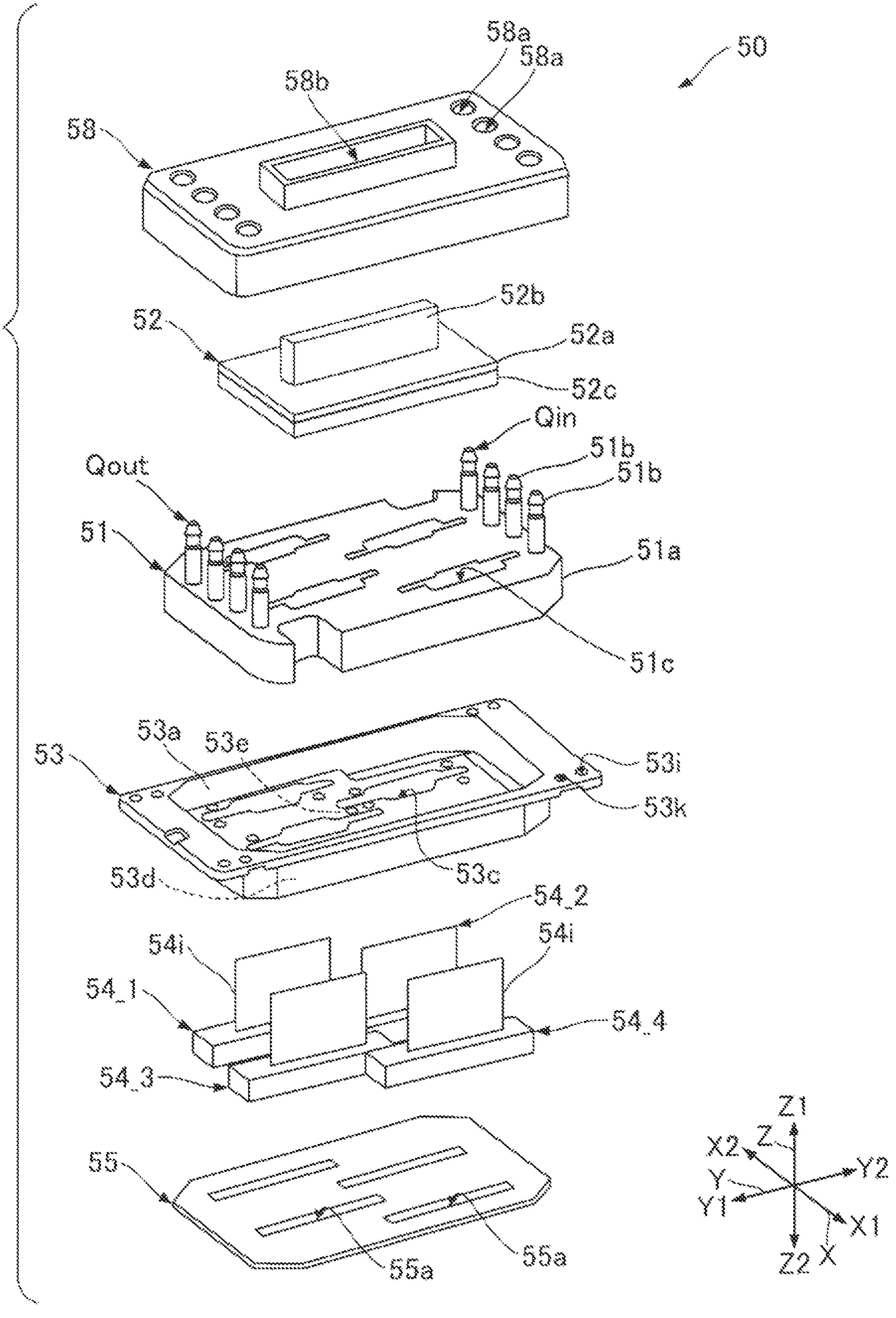
FIG. 4 is an exploded perspective view of the liquid ejecting head according to the first embodiment.

FIG. 4 is an exploded perspective view of the liquid ejecting head 50 according to the first embodiment. As illustrated in FIG. 4, the liquid ejecting head 50 has a flow path structure 51, a substrate unit 52, a holder 53, four head chips 54_1 to 54_4, a fixing plate 55, and a cover 58. These are disposed to be aligned in order of the cover 58, the substrate unit 52, the flow path structure 51, the holder 53, the four head chips 54, and the fixing plate 55 in the Z2-direction. Hereinafter, each portion of the liquid ejecting head 50 will be described.

The flow path structure 51 is a structure internally provided with a flow path for supplying the ink stored in the above-described main tank 10 to the four head chips 54. The flow path structure 51 has a flow path member 51*a* and eight coupling pipes 51*b*.

Although not illustrated, the flow path structure 51 is provided with four in-head supply flow paths SH1 provided for each of four types of the ink and four in-head recovery flow paths CH1 provided for each of four types of the ink. Each of the four in-head supply flow paths SH1 has one head inlet Qin that receives the ink from the in-device supply flow path SJ1 and two discharge ports that discharge the ink toward the inlet Pin of the head chip 54. Each of the four in-head recovery flow paths CH1 has two inlets that receive the ink from the outlet Pout of the head chip 54 and one head outlet Qout that discharges the ink to the in-device recovery flow path CJ1. Each of the plurality of coupling pipes 51*b* is either the head inlet Qin or the head outlet Qout, and is provided on a surface of the flow path member 51*a* facing the Z1-direction. In contrast, each of the discharge port of each in-head supply flow path SH1 and the inlet of each in-head recovery flow path CH1 is provided on a surface of the flow path member 51*a* facing the Z2-direction.

In addition, a plurality of wiring holes 51*c* are provided in the flow path member 51*a*. Each of the plurality of wiring holes 51*c* is a hole through which a wiring substrate 54*i* (to be described later) of the head chip 54 passes toward the substrate unit 52. A side surface of the flow path member 51*a* is provided with cutout portions at two locations in a circumferential direction. In addition, the flow path member 51*a* is provided with a hole (not illustrated), and is fixed to the holder 53 by screwing using the hole.

Although not illustrated, the flow path member 51_a_ has a configuration of a stacked body in which a plurality of substrates are stacked in a direction along the Z-axis.

Grooves and holes for forming the above-described in-head supply flow path SH1 and in-head recovery flow path CH1 are appropriately provided in each of the plurality of substrates. For example, these are joined to each other by using an adhesive, welding, or screwing.

Each of the eight coupling pipes 51_b_ is a pipe body protruding from the surface of the flow path member 51_a_ facing the Z1-direction. The eight coupling pipes 51_b_ correspond to the above-described four in-head supply flow paths SH1 and the four in-head recovery flow paths CH1. The above-described eight coupling pipes 51_b_ are used by being coupled to the above-described sub tank 151 via a tube forming the in-device supply flow path SJ1 and the in-device recovery flow path CJ1.

The substrate unit 52 is an assembly having a mounting component for electrically coupling the liquid ejecting head 50 to the control module 20. The substrate unit 52 has a circuit substrate 52_a_, a connector 52_b_, and a support plate 52_c_.

The circuit substrate 52_a_ is a printed wiring substrate such as a rigid wiring substrate having wiring for electrically coupling each head chip 54 and the connector 52_b_. The circuit substrate 52_a_ is disposed on the flow path structure 51 via the support plate 52_c_, and the connector 52_b_ is installed on the surface of the circuit substrate 52_a_ facing the Z1-direction.

The connector 52_b_ is a coupling component for electrically coupling the liquid ejecting head 50 and the control module 20. The support plate 52_c_ is a plate-shaped member for attaching the circuit substrate 52_a_ to the flow path structure 51. The circuit substrate 52_a_ is mounted on one surface of the support plate 52_c_, and the circuit substrate 52_a_ is fixed to the support plate 52_c_ by screwing.

The holder 53 is a structure that accommodates and supports the four head chips 54. The holder 53 is a structure that accommodates and supports the four head chips 54. The holder 53 has a substantially tray shape, and has a recess 53_a_, a plurality of wiring holes 53_c_, a plurality of recesses 53_d_, a plurality of holes 53_e_, a plurality of screw holes 53_i_, and a plurality of screw holes 53_k_. The recess 53_a_ is open in the Z1-direction, and is a space in which the above-described flow path member 51_a_ is disposed. Each of the plurality of wiring holes 53_c_ is a hole through which the wiring substrate 54_i_ of the head chip 54 passes toward the substrate unit 52. Each of the plurality of recesses 53_d_ is open in the Z2-direction, and is a space in which the head chip 54 is disposed. The plurality of holes 53_e_ are through holes for coupling each of the plurality of inlets Pin and outlet Pout which are provided in the plurality of head chips 54 (to be described later) and each of the discharge port of the in-head supply flow path SH1 and the inlet of the in-head recovery flow path CH1 which are formed in the flow path member 51_a_. The plurality of screw holes 53_i_ are screw holes for screwing the holder 53 to the support body 41. The plurality of screw holes 53_k_ are screw holes for screwing the cover 58 to the holder 53.

Each head chip 54 ejects the ink. Each head chip 54 has the plurality of nozzles N ejecting a first ink and the plurality of nozzles N ejecting a second ink different in type from the first ink. Here, the first ink and the second ink are two of the above-described four types of the ink. For example, each of the head chip 54_1 and the head chip 54_2 uses two of the four types of the ink as the first ink and the second ink. Each of the head chip 54_3 and the head chip 54_4 uses the other remaining two of the four types of the ink. Each head chip 54 is provided with the wiring substrate 54_i_. FIG. 4 illustrates a configuration of each head chip 54 in a simplified manner. The configuration of the head chip 54 will be described in detail with reference to FIG. 5 (to be described later).

The fixing plate 55 is a plate-shaped member to which the four head chips 54 and the holder 53 are fixed. Specifically, the fixing plate 55 is disposed in a state where the four head chips 54 are pinched between the holder 53 and the fixing plate 55, and each head chip 54 and the holder 53 are fixed by using an adhesive. The fixing plate 55 is provided with a plurality of opening portions 55_a_ exposing nozzle surfaces FN of the four head chips 54. In an example illustrated in FIG. 4, the plurality of opening portions 55_a_ are individually provided for each head chip 54. For example, the fixing plate 55 is made of a metal material such as stainless steel, titanium, and magnesium alloy.

The cover 58 is a box-shaped member that accommodates the substrate unit 52.

The cover 58 is provided with eight through holes 58_a_ and an opening portion 58_b_. The eight through holes 58_a_ correspond to the eight coupling pipes 51_b_ of the flow path structure 51, and the corresponding coupling pipes 51_b_ are inserted into the respective through holes 58_a_. The above-described connector 52_b_ passes through the opening portion 58_b_ from the inside to the outside of the cover 58.

1-5. Configuration of Head Chip

Figure 5:
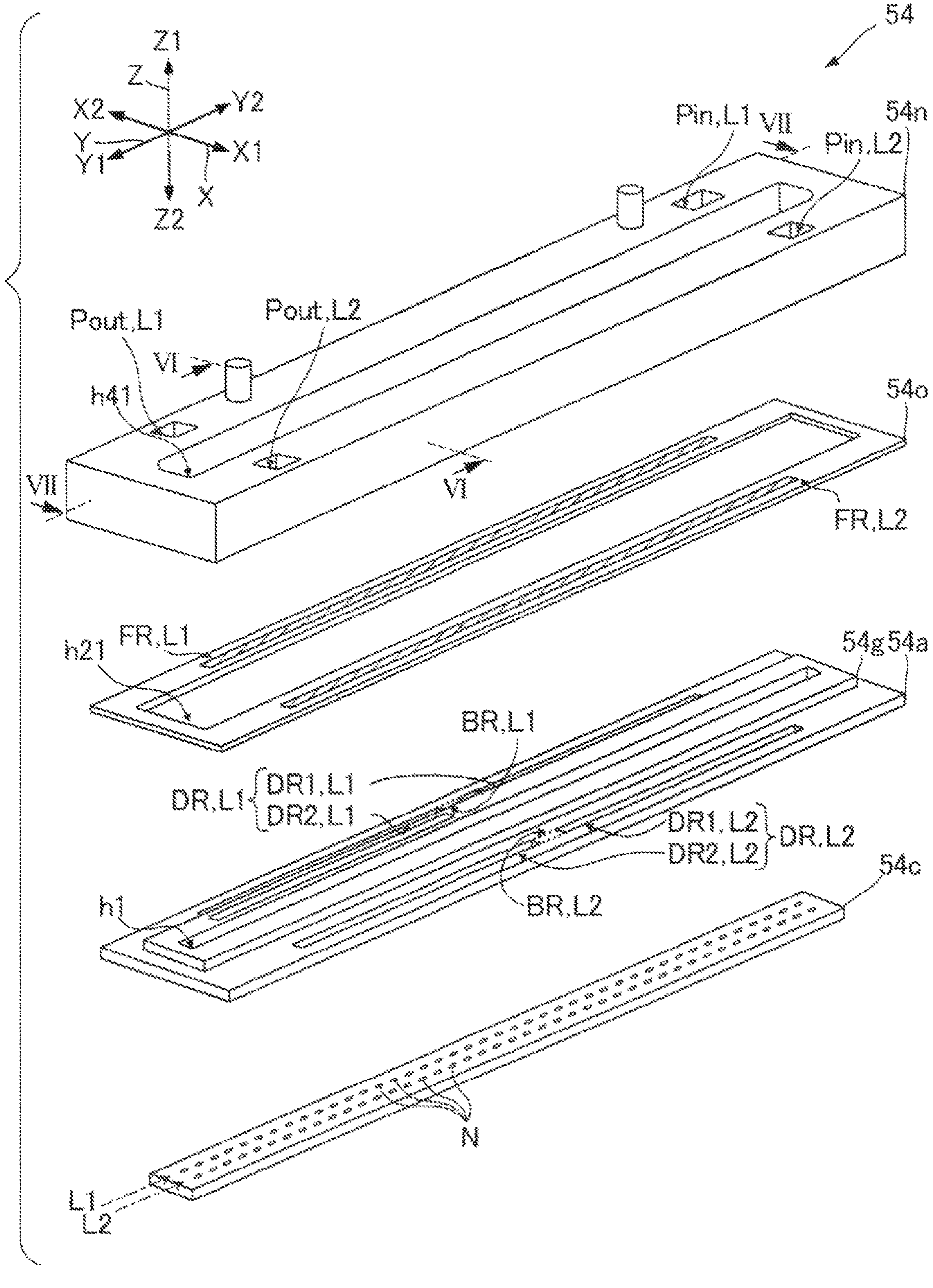
FIG. 5 is an exploded perspective view of a head chip.
Figure 6:
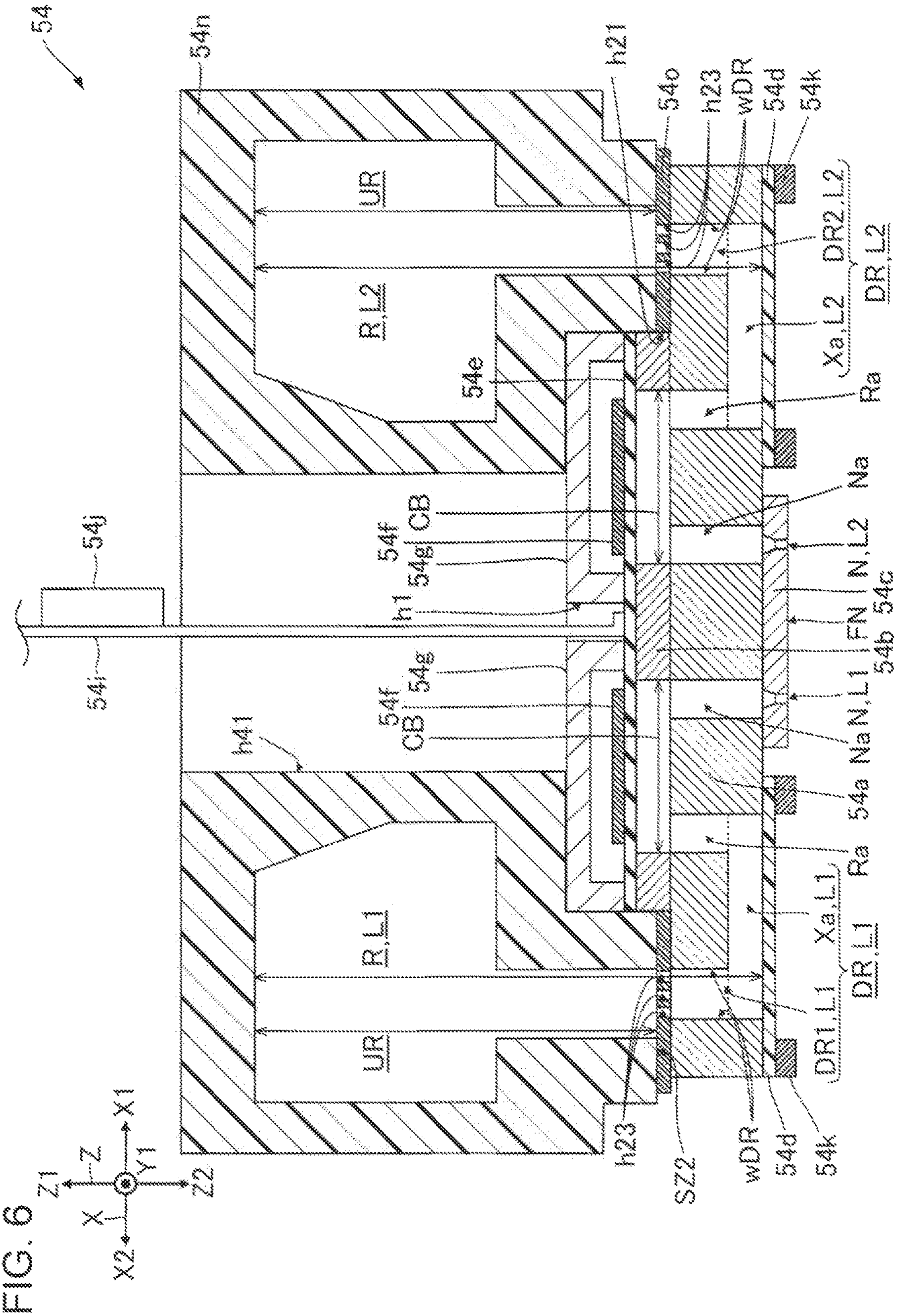
FIG. 6 is a cross-sectional view taken along line VI-VI in FIG. 5.
Figure 7:
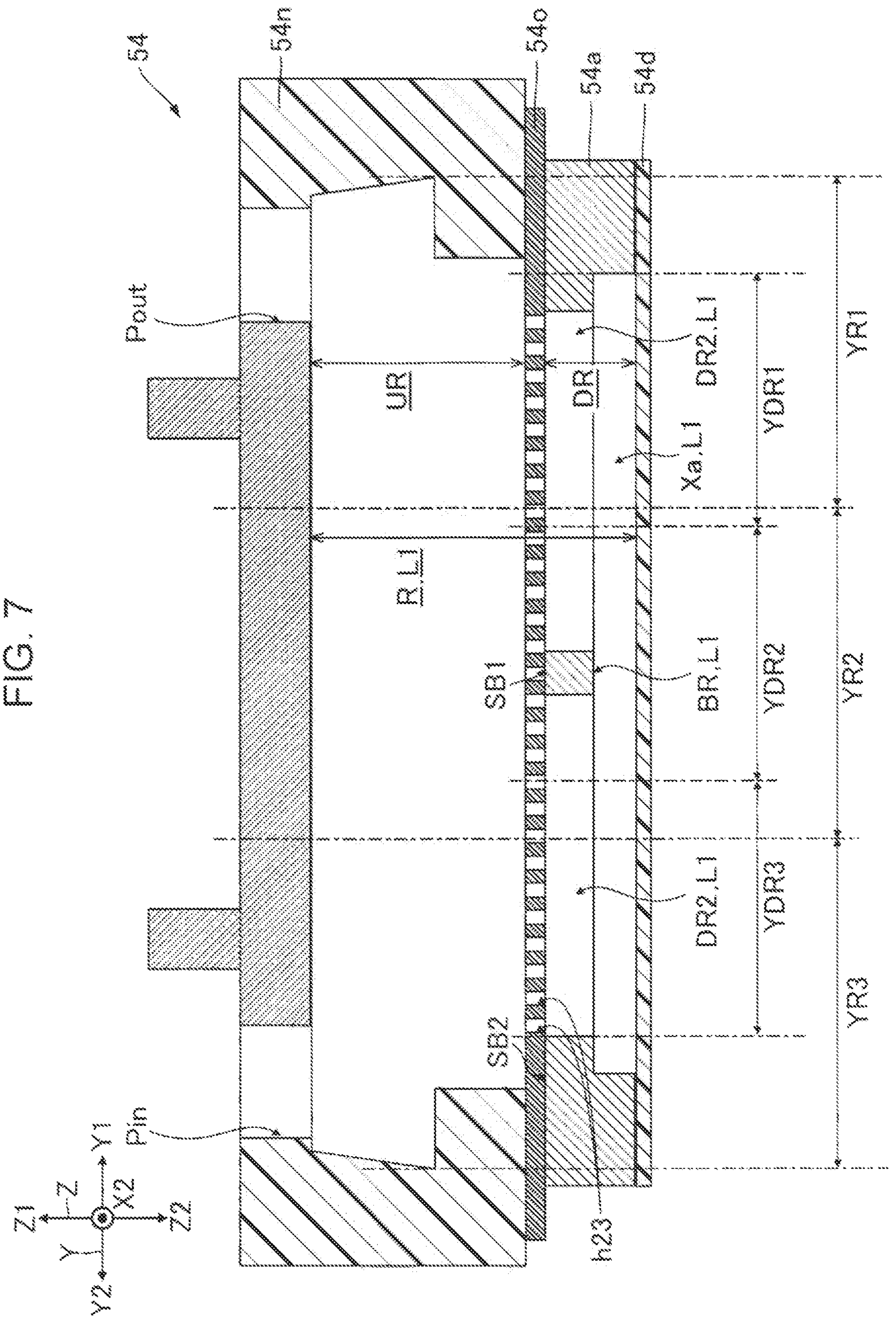
FIG. 7 is a cross-sectional view taken along line VII-VII in FIG. 5.

FIG. 5 is an exploded perspective view of the head chip 54. FIG. 6 is a cross-sectional view taken along line VI-VI in FIG. 5. FIG. 7 is a cross-sectional view taken along line VII-VII in FIG. 5. However, in FIG. 7, the wiring substrate 54_i_ is omitted in illustration so that the drawing is not complicated. As illustrated in FIGS. 5 and 6, the head chip 54 has the plurality of nozzles N arranged in the direction along the Y-axis. The plurality of nozzles N are divided into a first nozzle row L1 and a second nozzle row L2 aligned apart from each other in the direction along the X-axis. Each of the first nozzle row L1 and the second nozzle row L2 is a set of the plurality of nozzles N linearly arranged in the direction along the Y-axis. Hereinafter, the first nozzle row L1 and the second nozzle row L2 may be collectively referred to as a "nozzle row Ln". The first nozzle row L1 and the second nozzle row L2 are examples of a "nozzle row".

The head chips 54 are configured to be substantially symmetrical to each other in the direction along the X-axis. However, positions of the plurality of nozzles N of the first nozzle row L1 and the plurality of nozzles N of the second nozzle row L2 in the direction along the Y-axis may coincide with or may be different from each other. As an example, FIG. 6 illustrates a configuration in which the positions of the plurality of nozzles N of the first nozzle row L1 and the plurality of nozzles N of the second nozzle row L2 coincide with each other in the direction along the Y-axis.

As illustrated in FIGS. 5 and 6, the head chip 54 has a flow path forming member 54_a_, a pressure chamber substrate 54_b_, a nozzle plate 54_c_, a vibration absorber 54_d_, a diaphragm 54_e_, a plurality of piezoelectric elements 54_f_, a protective substrate 54_g_, the wiring substrate 54_i_, a drive circuit 54_j_, a frame body 54_k_, a case 54_n_, and a filter 54_o_. However, in FIG. 5, the pressure chamber substrate 54_b_, the diaphragm 54_e_, the plurality of piezoelectric elements 54_f_, the vibration absorber 54_d_, the wiring substrate 54_i_, the drive circuit 54_j_, and the frame body 54_k_ are omitted in illustration so that the drawing is not complicated.

The flow path forming member 54*a* and the pressure chamber substrate 54*b* are stacked in the Z1-direction in this order to form a flow path for supplying the ink to the plurality of nozzles N. The filter 54*o*, the pressure chamber substrate 54*b*, the diaphragm 54*e*, the plurality of piezoelectric elements 54*f*, the protective substrate 54*g*, the case 54*n*, the wiring substrate 54*i*, and the drive circuit 54*j* are installed in a region located in the Z1-direction with respect to the flow path forming member 54*a*. On the other hand, the nozzle plate 54*c*, the vibration absorber 54*d*, and the frame body 54*k* are installed in a region located in the Z2-direction with respect to the flow path forming member 54*a*. Each element of the head chip 54 is schematically a plate-shaped member elongated in the Y-direction, and the elements are joined to each other by using an adhesive, for example. Hereinafter, each element of the head chip 54 will be described in order.

The nozzle plate 54*c* is a plate-shaped member provided with the plurality of nozzles N of each of the first nozzle row L1 and the plurality of nozzles N of the second nozzle row L2. Each of the plurality of nozzles N is a through hole through which the ink passes. Here, a surface of the nozzle plate 54*c* facing the Z2-direction is the nozzle surface FN. That is, a normal direction of the nozzle surface FN is a direction of a normal vector of the nozzle surface FN, and is the Z2-direction which is the ejection direction.

The flow path forming member 54*a* is provided with a downstream chamber DR, a plurality of coupling flow paths Ra, and a plurality of communication flow paths Na (to be described later), for each of the first nozzle row L1 and the second nozzle row L2. Here, the downstream chamber DR communicating with the plurality of nozzles N of the first nozzle row L1 will be referred to as a downstream chamber DR[L1]. The downstream chamber DR communicating with the plurality of nozzles N of the second nozzle row L2 will be referred to as a downstream chamber DR[L2].

The downstream chamber DR[L1] includes an opening DR1[L1] penetrating the flow path forming member 54*a* in the Z-axis direction, an opening DR2[L1] penetrating the flow path forming member 54*a* in the Z-axis direction, and a coupling flow path Xa[L1]. The opening DR1[L1] and the opening DR2[L1] are divided by a beam portion BR[L1] extending in the X-axis direction. Each of the opening DR1[L1] and the opening DR2[L1] extends in the Y-axis direction. Similarly, the downstream chamber DR[L2] includes an opening DR1[L2] penetrating the flow path forming member 54*a* in the Z-axis direction, an opening DR2[L2] penetrating the flow path forming member 54*a* in the Z-axis direction, and a coupling flow path Xa[L2]. The opening DR1[L2] and the opening DR2[L2] are divided by a beam portion BR[L2] extending in the X-axis direction. Each of the opening DR1[L2] and the opening DR2[L2] extends in the Y-axis direction.

Here, when the openings DR1[L1] and DR1[L2] are not particularly distinguished, the openings will be simply referred to as an opening DR1. In addition, when the coupling flow path Xa[L1] and the coupling flow path Xa[L2] are not particularly distinguished, the coupling flow paths will be simply referred to as a coupling flow path Xa. Furthermore, when the openings DR2[L1] and DR2[L2] are not particularly distinguished, the openings will be simply referred to as an opening DR2. When the beam portion BR[L1] and the beam portion BR[L2] are not particularly distinguished, the beam portions will be simply referred to as a beam portion BR.

The beam portion BR extends along the X-axis, and couples inner walls wDR of the downstream chamber DR. The inner walls wDR are separated in the direction along the X-axis. However, an extending direction of the beam portion BR may be a direction intersecting with the Y-axis, and is not limited to the X-axis. The beam portion BR is a portion of the flow path forming member 54*a*. The beam portion BR is provided at a position substantially at the center in the direction along the Y-axis. Therefore, in FIG. 6, when a cross section taken along line VI-VI is viewed in the Y2-direction, the beam portion BR is originally visible. However, the opening DR1 is not illustrated to easily understand the opening DR1. Although one beam portion BR is provided corresponding to each of the first nozzle row L1 and the second nozzle row L2 in an example in FIG. 5, a plurality of the beam portions BR may be provided corresponding to the first nozzle row L1 and the second nozzle row L2. It can be said that the direction along the X-axis is a direction intersecting with the direction along the Y-axis. The direction along the X-axis is an example of "a direction intersecting with the first direction".

The coupling flow path Xa communicates with the plurality of coupling flow paths Ra in one end in the X-axis direction, and communicates with both the opening DR1 and the opening DR2 in the other end in the X-axis direction. That is, the ink passing through the openings DR1 and DR2 flows to the plurality of coupling flow paths Ra via the coupling flow path Xa. Each of the coupling flow path Ra and the communication flow path Na is a through hole formed for each nozzle N.

As illustrated in FIG. 6, a common liquid chamber R communicating with the plurality of nozzles N is provided for each of the first nozzle row L1 and the second nozzle row L2. The common liquid chamber R extends in a direction along the Y-axis orthogonal to the Z2-direction which is the ejection direction. In the following description, the common liquid chamber R communicating with the plurality of nozzles N of the first nozzle row L1 may be referred to as a common liquid chamber R[L1]. The common liquid chamber R communicating with the plurality of nozzles N of the second nozzle row L2 may be referred to as a common liquid chamber R[L2]. The common liquid chamber R stores the ink to be supplied to a plurality of pressure chambers CB. The common liquid chamber R is defined by a vibration absorber 54*d*, the flow path forming member 54*a*, the filter 54*o*, and the case 54*n*. The filter 54*o* partitions the common liquid chamber R into an upstream chamber UR and the downstream chamber DR. The flow path forming member 54*a* defines a portion of the downstream chamber DR.

The pressure chamber substrate 54*b* is a plate-shaped member provided with the plurality of pressure chambers CB for each of the first nozzle row L1 and the second nozzle row L2. The plurality of pressure chambers CB are arranged in the direction along the Y-axis. Each pressure chamber CB is an elongated space formed for each nozzle N and extending in the direction along the X-axis in a plan view. As in the above-described nozzle plate 54*c*, each of the flow path forming member 54*a* and the pressure chamber substrate 54*b* is manufactured by processing a silicon single crystal substrate by using a semiconductor manufacturing technique, for example. However, other known methods and materials may be appropriately used for manufacturing each of the flow path forming member 54*a* and the pressure chamber substrate 54*b*.

In addition, it is preferable that the flow path forming member 54*a* and the beam portion BR are formed of an integral silicon single crystal substrate. However, after each of the flow path forming member 54*a* and the beam portion BR is separately manufactured, the beam portion BR may be welded to the flow path forming member 54*a*.

The pressure chamber CB is a space located between the flow path forming member 54*a* and the diaphragm 54*e*. The plurality of pressure chambers CB are arranged in the direction along the Y-axis for each of the first nozzle row L1 and the second nozzle row L2. In addition, the pressure chamber CB communicates with each of the communication flow path Na and the coupling flow path Ra. Accordingly, the pressure chamber CB communicates with the nozzle N via the communication flow path Na, and communicates with the downstream chamber DR via the coupling flow path Ra.

The diaphragm 54*e* is disposed on a surface of the pressure chamber substrate 54*b* facing the Z1-direction. The diaphragm 54*e* is a plate-shaped member capable of vibrating elastically. For example, the diaphragm 54*e* has a first layer and a second layer, and the first layer and the second layer are stacked in the Z1-direction in this order. For example, the first layer is an elastic film made of silicon oxide. For example, the elastic film is formed by thermally oxidizing one surface of a silicon single crystal substrate. For example, the second layer is an insulating film made of zirconium oxide. For example, the insulating film is formed by forming a zirconium layer by sputtering and thermally oxidizing the layer. The diaphragm 54*e* is not limited to a configuration resulting from the stacking of the first layer and the second layer described above, and for example, may be configured to have a single layer, or may be configured to have three or more layers.

The plurality of piezoelectric elements 54*f* mutually corresponding to the nozzles N are disposed as drive elements for each of the first nozzle row L1 and the second nozzle row L2 on the surface of the diaphragm 54*e* facing the Z1-direction. Each piezoelectric element 54*f* is a passive element deformed by the supply of the drive signal Com. Each piezoelectric element 54*f* has an elongated shape extending in the direction along the X-axis in a plan view. The plurality of piezoelectric elements 54*f* are arranged in the direction along the Y-axis to correspond to the plurality of pressure chambers CB. The piezoelectric element 54*f* overlaps the pressure chamber CB in a plan view.

Although not illustrated, each piezoelectric element 54*f* has a first electrode, a piezoelectric layer, and a second electrode, and these are stacked in the Z1-direction in this order. One of the first electrode and the second electrode is an individual electrode disposed apart from each other for each piezoelectric element 54*f*, and the drive signal Com is applied to the one electrode. The other of the first electrode and the second electrode is a strip-shaped common electrode extending in the direction along the Y-axis to be continuous over the plurality of piezoelectric elements 54*f*, and a predetermined reference potential is supplied to the other electrode. For example, metal materials of these electrodes include metal materials such as platinum, aluminum, nickel, gold, and copper. Among these materials, one can be used alone, or two or more can be used in combination in an aspect of alloy or stacking. The piezoelectric layer is made of a piezoelectric material such as lead zirconate titanate, and for example, has a strip shape extending in the direction along the Y-axis to be continuous over the plurality of piezoelectric elements 54*f*. However, the piezoelectric layer may be integrated over the plurality of piezoelectric elements 54*f*. In this case, on the piezoelectric layer, a through hole penetrating the piezoelectric layer and extending in the direction along the X-axis is provided in a region corresponding to a gap between the pressure chambers CB adjacent to each other in a plan view. When the diaphragm 54*e* vibrates in conjunction with the deformation of the piezoelectric element 54*f*, a pressure inside the pressure chamber CB fluctuates to eject the ink from the nozzle N. The piezoelectric element 54*f* is an example of a "drive element". Alternatively, as the drive element, a heating element for heating the ink inside the pressure chamber CB may be used instead of the piezoelectric element 54*f*.

The protective substrate 54*g* is a plate-shaped member installed on the surface of the diaphragm 54*e* facing the Z1-direction, protects the plurality of piezoelectric elements 54*f*, and reinforces mechanical strength of the diaphragm 54*e*. As illustrated in FIGS. 5 and 6, the protective substrate 54*g* is provided with an opening h1. The opening h1 is a hole through which the wiring substrate 54*i* passes. In addition, on the surface of the protective substrate 54*g* facing the Z2-direction, two recesses recessed in the Z1-direction are formed corresponding to each of the two first nozzle row L1 and second nozzle row L2. The plurality of piezoelectric elements 54*f* are accommodated between the recess of the protective substrate 54*g* and the diaphragm 54*e*. For example, the protective substrate 54*g* is configured to have a silicon single crystal substrate.

The filter 54*o* is a plate-shaped or sheet-shaped member stacked on the surface of the flow path forming member 54*a* facing the Z1-direction. The filter 54*o* captures foreign matters mixed in the ink while allowing passage of the ink.

The filter 54*o* is provided with a plurality of filter holes h23 through which the ink passes and an opening h21. The opening h21 is a through hole through which the pressure chamber substrate 54*b* passes. The plurality of filter holes h23 are provided inside a filter hole region FR. In the following description, the filter hole region FR provided with the filter hole h23 communicating with the downstream chamber DR[L1] may be referred to as a filter hole region FR[L1], and the filter hole region FR provided with the filter hole h23 communicating with the downstream chamber DR[L2] may be referred to as a filter hole region FR[L2]. The filter hole h23 provided in the filter hole region FR[L1] may be referred to as a filter hole h23[L1], and the filter hole h23 provided in the filter hole region FR[L2] may be referred to as a filter hole h23[L2]. The filter hole region FR is configured to have an electroformed filter. For example, a material forming the electroformed filter is Ni—Pd alloy. Alternatively, the material forming the electroformed filter may be stainless steel.

The case 54*n* is a member stacked on the surface of the filter 54*o* facing the Z1-direction. The case 54*n* defines the upstream chamber UR. The case 54*n* is provided with an opening h41, the upstream chamber UR communicating with the plurality of nozzles N of the first nozzle row L1, the upstream chamber UR communicating with the plurality of nozzles N of the second nozzle row L2, the inlet Pin provided in each of the two upstream chambers UR, and the outlet Pout provided in each of the two upstream chambers UR. The opening h41 is a hole through which the wiring substrate 54*i* passes. In the following description, the upstream chamber UR included in the common liquid chamber R[L1] may be referred to as an upstream chamber UR[L1], and the upstream chamber UR included in the common liquid chamber R[L2] may be referred to as an upstream chamber UR[L2]. The upstream chamber UR is formed in such a manner that the case 54*n* is recessed in the Z1-direction from a surface SZ2 facing the Z2-direction.

The case 54*n* is made of a resin material such as a modified polyphenylene ether resin, a polyphenylene sulfide resin, and a polypropylene resin. Alternatively, the case 54*n* may be made of a metal material.

The vibration absorber 54*d* is also called a compliance substrate, is a flexible resin film forming a wall surface of the common liquid chamber R, and absorbs pressure fluctuations of the ink inside the common liquid chamber R. The vibration absorber 54*d* may be a flexible thin plate made of metal. A surface of the vibration absorber 54*d* facing the Z1-direction is joined to the flow path forming member 54*a* by using an adhesive. On the other hand, the frame body 54*k* is joined to the surface of the vibration absorber 54*d* facing the Z2-direction by using an adhesive. The frame body 54*k* is a frame-shaped member along an outer periphery of the vibration absorber 54*d*, and comes into contact with the above-described fixing plate 55. Here, for example, the frame body 54*k* is made of a metal material such as stainless steel, aluminum, titanium, and magnesium alloy.

The wiring substrate 54*i* is mounted on the surface of the diaphragm 54*e* facing the Z1-direction, and is a mounting component for electrically coupling the control module 20 and the head chip 54. For example, the wiring substrate 54*i* is a flexible wiring substrate such as COF, FPC, or FFC. The COF is an abbreviation for Chip On Film. The FPC is an abbreviation for Flexible Printed Circuit. The FFC is an abbreviation for Flexible Flat Cable. The drive circuit 54*j* for supplying a drive voltage to each piezoelectric element 54*f* is mounted on the wiring substrate 54*i* of the present embodiment. The drive circuit 54*j* is a circuit that switches whether or not to supply at least a portion of a waveform included in the drive signal Com as a drive pulse, based on the control signal SI.

1-6. Regarding Beam Portion BR

Rigidity of the flow path forming member 54*a* tends to be lower than rigidity of the case 54*n*. Specifically, the case 54*n* has an outer wall in the Z1-direction. Therefore, the rigidity can be maintained to some extent. On the other hand, the flow path forming member 54*a* has an elongated opening extending in the direction along the Y-axis. Therefore, the rigidity decreases. As the rigidity of the case 54*n* decreases, there is a possibility that the flow path forming member 54*a* may be deformed due to pressurization in a case of adhesive hardening, for example. Therefore, in the present embodiment, the beam portion BR is provided in the flow path forming member 54*a*. In this manner, it is possible to prevent a decrease in the rigidity of the flow path forming member 54*a*.

In accordance with the beam portion BR located at the center of the downstream chamber DR on the Y-axis, it is possible to further prevent a decrease in the rigidity of the flow path forming member 54*a*. Specifically, as illustrated in FIG. 7, the beam portion BR is included in a range YDR2 located at the center of a range YDR1, the range YDR2, and a range YDR3 when the downstream chamber DR is equally divided into three by a plane parallel to an XZ-plane. Furthermore, although not illustrated in FIG. 7, it is preferable that the beam portion BR is included in a range located at the center when the downstream chamber DR is equally divided into five by a plane parallel to the XZ-plane.

The inlet Pin and the outlet Pout are respectively provided in both end portions of the common liquid chamber R in the direction along the Y-axis. For example, the reason is as follows. When the inlet Pin and the outlet Pout are provided at the center of the common liquid chamber R in the direction along the Y-axis, the ink stagnates in both end portions of the common liquid chamber R in the direction along the Y-axis, and there is a high possibility that air bubbles may stay. Therefore, inevitably, as understood from FIGS. 5 and 7, the beam portion BR is located between the inlet Pin and the outlet Pout when viewed in the direction along the Z-axis. More specifically, positions of the beam portion BR, the inlet Pin, and the outlet Pout will be described by using a range YR1, a range YR2, and a range YR3 when the common liquid chamber R is equally divided into three by a plane parallel to the XZ-plane. As illustrated in FIG. 7, the width of the upstream chamber UR in the direction along the Y-axis is longer than the width of the downstream chamber DR in the direction along the Y-axis, and when viewed in the direction along the Z-axis, all of the downstream chamber DR overlap the upstream chamber UR. Therefore, a range YR1, a range YR2, and a range YR3 coincide with a range when the upstream chamber UR is equally divided into three by a plane parallel to the XZ-plane. The beam portion BR is included in the range YR2 located at the center of the range YR1, the range YR2, and the range YR3. A fact that the inlet Pin and the outlet are provided in both end portions of the common liquid chamber R in the direction along the Y-axis means that the inlet Pin and the outlet Pout are included in any of the ranges located in both ends of three or more ranges, when the common liquid chamber R is equally divided into three or more by a plane parallel to the XZ-plane. The number of the equally divided common liquid chamber R by the plane parallel to the XZ-plane is not limited to three, and is preferably four or five. Therefore, it is preferable that the inlet Pin and the outlet Pout are included in any of the ranges located in both ends of the equally divided four or five ranges. When the range YR1, the range YR2, and the range YR3 are used, the inlet Pin is included in the range YR3 located closest in the Y2-direction among the range YR1, the range YR2, and the range YR3. The outlet Pout is included in the range YR1 located closest in the Y1-direction, in the range YR1, the range YR2, and the range YR3.

As illustrated in FIG. 7, a surface SB1 of the beam portion BR facing the case 54*n* is flush with a surface SB2 of the flow path forming member 54*a* facing the case 54*n*. The flush means that there is no step between two surfaces. Therefore, no gap is formed between the beam portion BR and the filter 54*o* in the direction along the Z-axis. The beam portion BR supports a portion of the filter 54*o*, specifically, a portion that overlaps the beam portion BR when viewed along the Z-axis.

1-7. Filling Process

As a method for filling the circulation path KJ with the ink in a state where the circulation path KJ is not filled with the ink, for example, it is conceivable to adopt the following aspect. After a first circulation operation is performed, the on-off valve 16 is closed, and the supply flow path SF1 is pressurized by the pump 159. In this manner, a pressurization discharge operation for discharging the ink from the plurality of nozzles N is performed. However, the inventors have found the followings through experiments. In an aspect in which the common liquid chamber R has the filter 54*o* and the flow path forming member 54*a* has the beam portion BR, in the filling process in which the pressurization discharge operation is performed after the first circulation operation is performed, the first circulation operation causes the air bubbles to stay in a region pinched between the filter 54*o* and the beam portion BR or at a corner of the beam portion BR. Furthermore, the air bubbles combine with other air bubbles at a position where the air bubbles stay, and grow into large air bubbles. The region pinched between the two members means that one member of the two members is in contact with this region in one direction, and that the other member of the two members is in contact with this region in the other direction different from the one direction. The staying of the air bubbles in the region pinched between the filter 54$o$ and the beam portion BR or at the corner of the beam portion BR will be described with reference to FIGS. 8 and 9.

Figure 8:
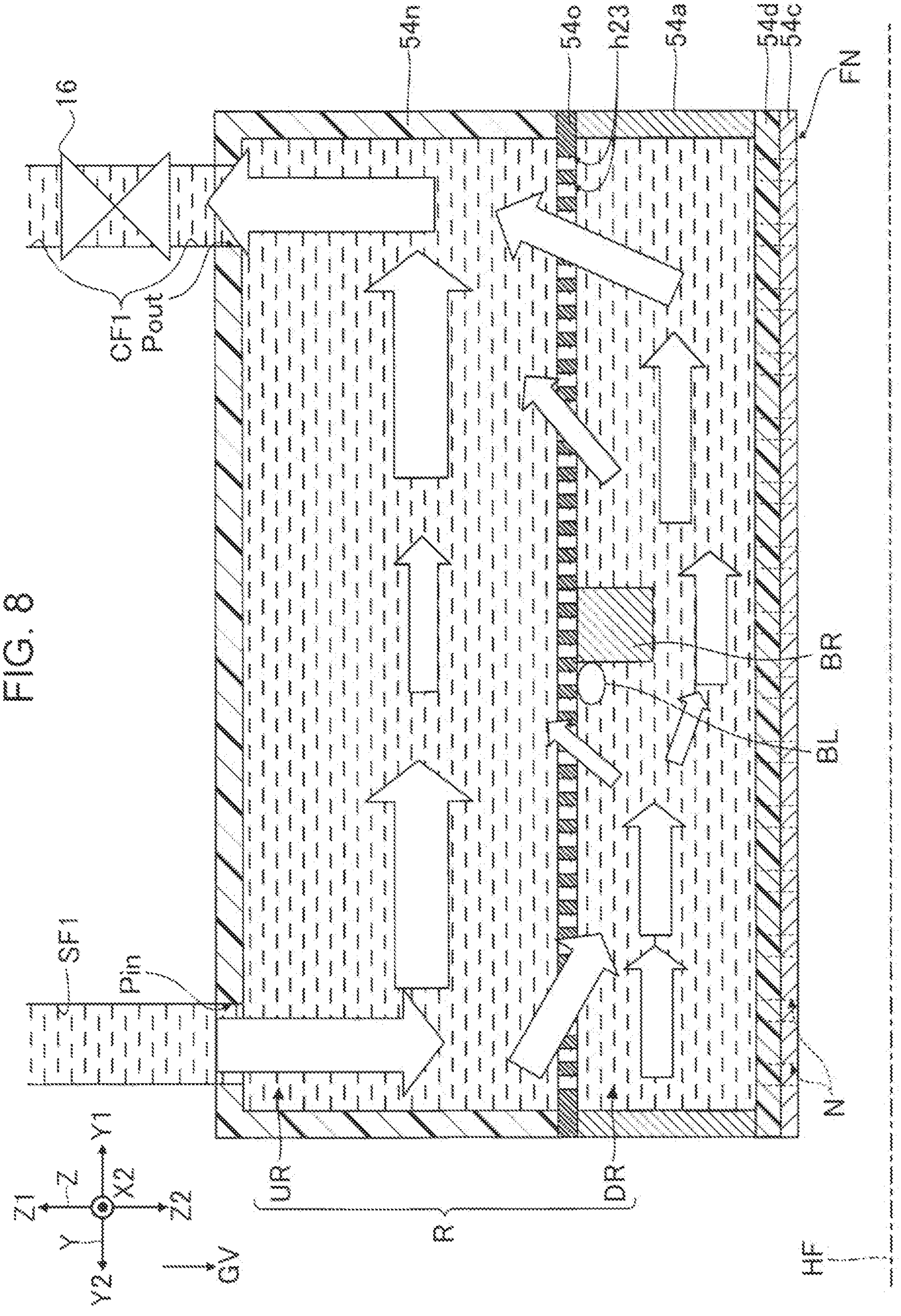
FIG. 8 is a view illustrating a flow of an ink inside a common liquid chamber while a first circulation operation is performed in a state where a circulation path is not filled with the ink.

FIG. 8 is a view illustrating a flow of the ink inside the common liquid chamber R while the first circulation operation is performed in a state where the circulation path KJ is not filled with the ink. However, in FIG. 8, and FIGS. 9, 11, 12, 14, 15, 18, 19, 20, 21, 22, 24, 25, and 26 (to be described later), the common liquid chamber R is illustrated as a rectangular shape to easily indicate the flow of the ink. Furthermore, in FIGS. 8, 9, 11, 12, 14, 15, 18, 19, 20, 21, 22, 24, 25, and 26, in order to intuitively indicate the flow of the ink, the flow of the ink is illustrated by increasing a size of an arrow indicating the flow of the ink as a flow rate of the ink increases. Furthermore, in FIGS. 8, 9, 11, 12, 14, 15, 18, 19, 20, 21, 22, 24, 25, and 26, a range filled with the ink is illustrated by shading with a broken line in a horizontal direction. Furthermore, in FIGS. 8, 9, 11, 12, 14, 15, 18, 19, 20, 21, 22, 24, 25, and 26, in order to indicate a positional relationship between the common liquid chamber R and the nozzle N, a contour of the nozzle N is illustrated by a broken line. Furthermore, FIGS. 8, 9, 11, 12, 14, 15, 18, 19, 20, 21, 22, 24, 25, and 26 illustrate a gravity direction GV. As described above, in the first embodiment, the gravity direction GV coincides with the Z2-direction. Therefore, a horizontal plane HF and the nozzle surface FN are parallel. Furthermore, in FIGS. 8, 9, 11, 12, 14, 15, 18, 19, 20, 21, 22, 24, 25, and 26, in order to facilitate understanding, in a state where the on-off valve 16 is open, the on-off valve 16 is illustrated as a white-outlined figure, and in a state where the on-off valve 16 is closed, the on-off valve 16 is illustrated as a black-painted figure. As illustrated in FIG. 8, the on-off valve 16 is open during the first circulation operation.

As illustrated in FIG. 8, the ink introduced from the inlet Pin flows inside the upstream chamber UR, and is discharged from the outlet Pout. Furthermore, a portion of the ink introduced from the inlet Pin flows into the downstream chamber DR via the filter hole h23, and flows inside the downstream chamber DR. The flow rate of the ink inside the downstream chamber DR is lower than the flow rate of the ink inside the upstream chamber UR by the amount passing through the filter hole h23. Furthermore, as illustrated in FIG. 8, the ink flowing inside the downstream chamber DR collides with the beam portion BR, and branches in the Z2-direction and the Z1-direction.

The ink flows into the circulation path KJ in a state where the circulation path KJ is not filled with the ink. Therefore, the air filling the circulation path KJ becomes the air bubbles, and the air bubbles are generated in the common liquid chamber R. With regard to the pressure of the ink flowing through the common liquid chamber R while the first circulation operation is performed, a strong negative pressure acts in the vicinity of the outlet Pout. Therefore, the air bubbles are less likely to stay, and the air bubbles in the vicinity of the outlet Pout are easily discharged from the outlet Pout. On the other hand, a negative pressure is less likely to act between the inlet Pin and the outlet Pout, compared to the vicinity of the outlet Pout. Therefore, the flow rate of the ink decreases. Furthermore, as described above, the flow rate of the ink inside the downstream chamber DR is lower than the flow rate of the ink inside the upstream chamber UR. Therefore, the air bubbles inside the downstream chamber DR are less affected by the flow of the ink in the first circulation operation, and are relatively greatly affected by a buoyant force. Therefore, while moving in the Y1-direction, the air bubbles move in the Z1-direction which is an opposite direction of the gravity direction GV. As described above, the air bubbles located in the Y2-direction with respect to the beam portion BR inside the downstream chamber DR tend to grow after being gathered in the region pinched between the filter 54$o$ and the beam portion BR or at the corner of the beam portion BR. FIG. 8 illustrates an air bubble BL located in the Y2-direction with respect to the beam portion BR and grown after being gathered in the region pinched between the filter 54$o$ and the beam portion BR. It can be said that the position in the Y2-direction with respect to the beam portion BR is a position closer to the inlet Pin in the two directions along the Y-axis with respect to the beam portion BR.

Figure 9:
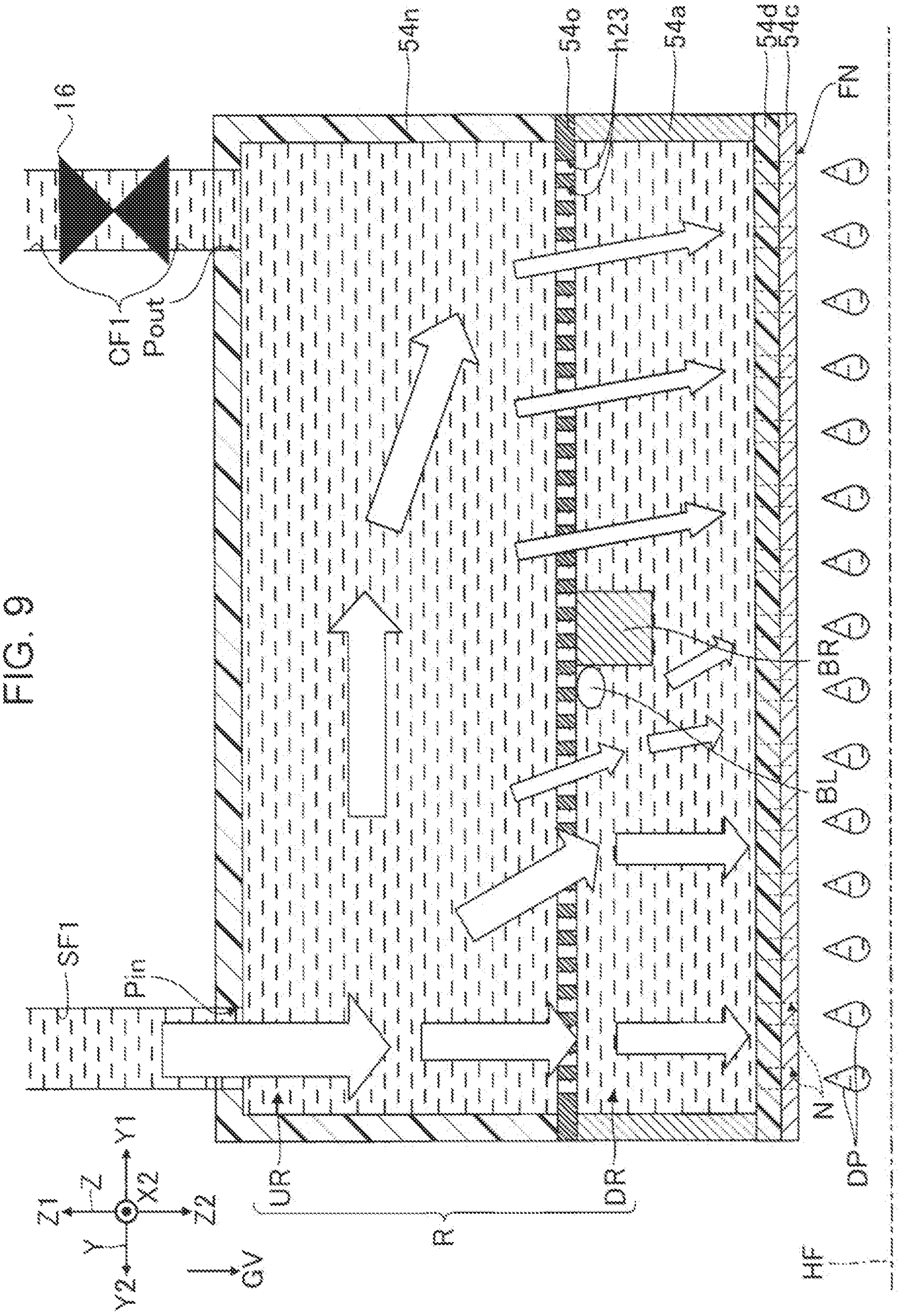
FIG. 9 is a view illustrating a flow of the ink inside the common liquid chamber while a pressurization discharge operation is performed after the first circulation operation.

FIG. 9 is a view illustrating a flow of the ink inside the common liquid chamber R while the pressurization discharge operation is performed after the first circulation operation. In the pressurization discharge operation, the on-off valve 16 is closed, and the supply flow path SF1 is pressurized to discharge the ink from the plurality of nozzles N. Therefore, as illustrated in FIG. 9, the on-off valve 16 is closed during the pressurization discharge operation. In the pressurization discharge operation, the discharge port of the ink is only the nozzle N. Therefore, the ink is discharged from the nozzle N. As illustrated in FIG. 9, a droplet DP is discharged from each of the plurality of nozzles N. As illustrated in FIG. 9, the flow of the ink inside the upstream chamber UR reaches the downstream chamber DR via the filter hole h23 of the filter 54$o$. As illustrated in FIG. 9, a flowing direction of the ink inside the downstream chamber DR is a direction substantially parallel to the Z2-direction. A degree of the flow generated by the pressurization discharge operation cancels out the buoyant force acting on the air bubble BL, and the air bubble BL tends to stay as it is in the region pinched between the filter 54$o$ and the beam portion BR or at the corner of the beam portion BR.

When a printing operation is performed while the air bubble BL stays, a large negative pressure acts on the common liquid chamber R in a case where a large amount of the ink is consumed for solid printing. In this manner, the air bubble BL is drawn into the nozzle N from the common liquid chamber R, thereby causing a possibility of poor ejection.

Therefore, in the filling process according to the present embodiment, the liquid ejecting apparatus 100 performs the first circulation operation, performs the first pressurization discharge operation after the first circulation operation, performs an air bubble moving operation after the first pressurization discharge operation, and performs the second pressurization discharge operation after the air bubble moving operation. The air bubble moving operation is an operation for moving the ink inside the downstream chamber DR in a direction different from a direction in which the ink inside the downstream chamber DR is moved by the first circulation operation. In the air bubble moving operation, the ink is moved in the direction different from the direction in which the ink inside the downstream chamber DR is moved by the first circulation operation. In this manner, the air bubbles BL staying inside the downstream chamber DR can be moved by the first circulation operation. As illustrated in FIG. 8, the direction in which the ink inside the downstream chamber DR is moved by the first circulation operation is the Y1-direction. The air bubble moving operation is an example of a "predetermined operation".

The air bubble moving operation according to the first embodiment is a preliminary ejection operation for ejecting the ink that does not directly contribute to image formation from all of the plurality of nozzles N. In the preliminary ejection operation according to the first embodiment, as in the flushing operation, the ink is ejected to the liquid receiving section 182 from all of the plurality of nozzles N by supplying the drive signal Com to the piezoelectric element 54*f*. The ink does not land on the medium PP by ejecting the ink to the liquid receiving section 182. Therefore, it can be said that the preliminary ejection operation is an operation for ejecting the ink that does not directly contribute to the image formation. For example, the drive signal Com at the time of the preliminary ejection operation and the drive signal Com at the time of the flushing operation are signals having the same contents.

1-8. Filling Process According to First Embodiment

Figure 10:
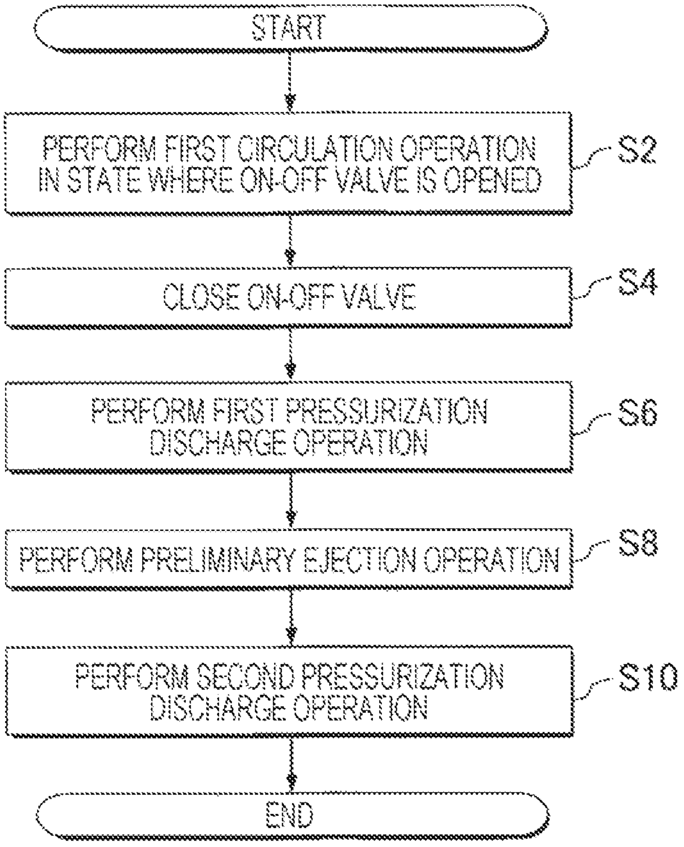
FIG. 10 is a view illustrating a flowchart illustrating a filling process according to the first embodiment.

FIG. 10 is a flowchart illustrating the filling process according to the first embodiment. In Step S2, the liquid ejecting apparatus 100 opens the on-off valve 16 and performs the first circulation operation in a state where the circulation path KJ is not filled with the ink. A state inside the common liquid chamber R in Step S2 coincides with a state illustrated in FIG. 8.

After Step S2 is completed, the liquid ejecting apparatus 100 closes the on-off valve 16 in Step S4, and performs the first pressurization discharge operation in Step S6. A state inside the common liquid chamber R in Step S6 coincides with a state illustrated in FIG. 9. Since the first pressurization discharge operation is performed, the plurality of nozzles N are filled with the ink. As described above, the air bubbles BL cannot be moved in the pressurization discharge operation.

After Step S6 is completed, the liquid ejecting apparatus 100 performs the preliminary ejection operation in Step S8.

Figure 11:
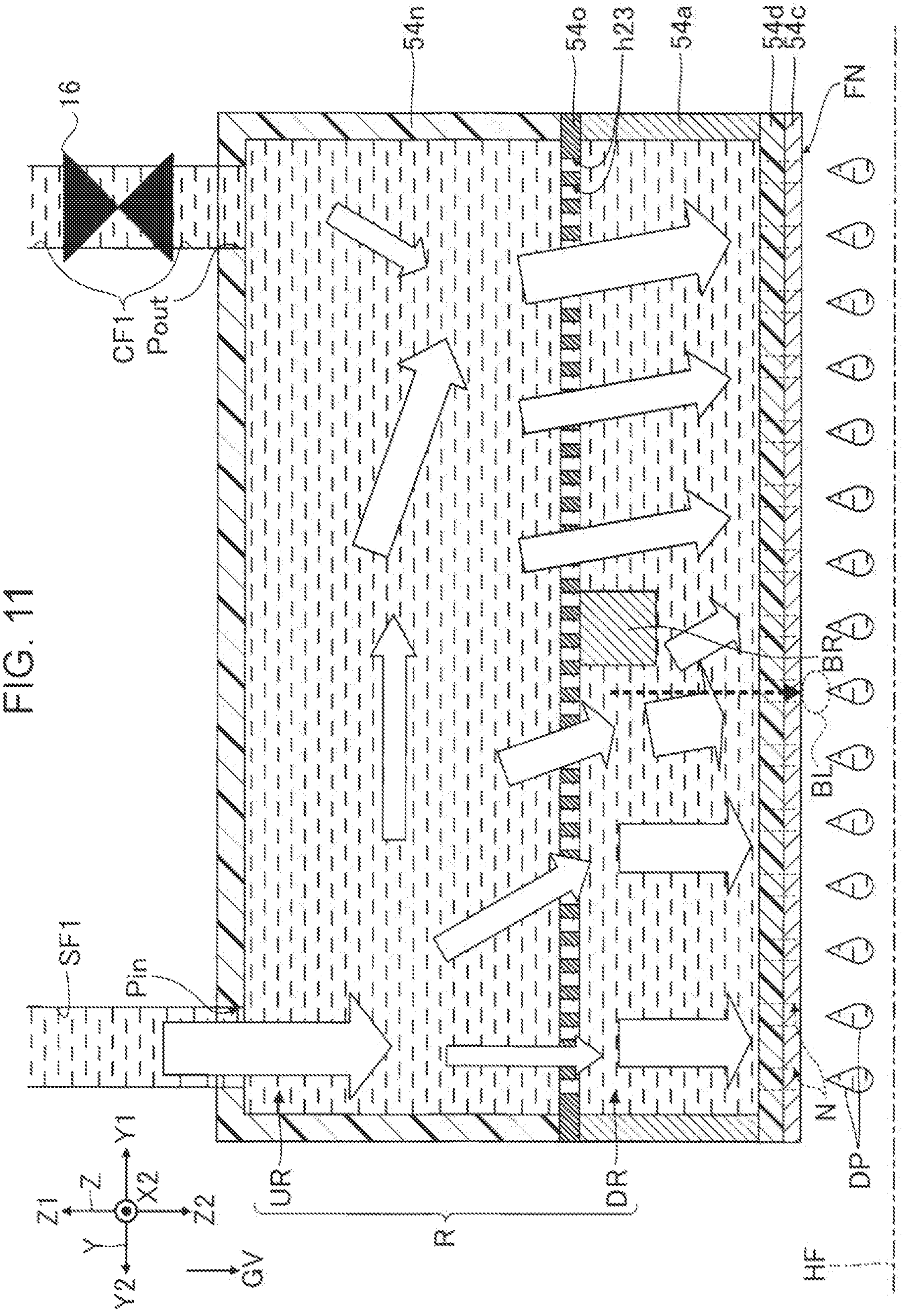
FIG. 11 is a view illustrating a flow of the ink inside the common liquid chamber while Step S8 is performed.

FIG. 11 is a view illustrating a flow of the ink inside the common liquid chamber R while Step S8 is performed. As illustrated in FIG. 11, a direction in which the ink inside the downstream chamber DR is moved by the preliminary ejection operation is the Z2-direction, and is different from the Y1-direction which is the direction in which the ink inside the downstream chamber DR is moved by the first circulation operation. A strong negative pressure acts inside the common liquid chamber R by performing the preliminary ejection operation. Therefore, as illustrated in FIG. 11, the air bubbles BL move to the nozzle N, and the air bubbles BL are discharged together with the ink from the nozzle N.

After Step S8 is completed, the liquid ejecting apparatus 100 performs the second pressurization discharge operation in Step S10.

Figure 12:
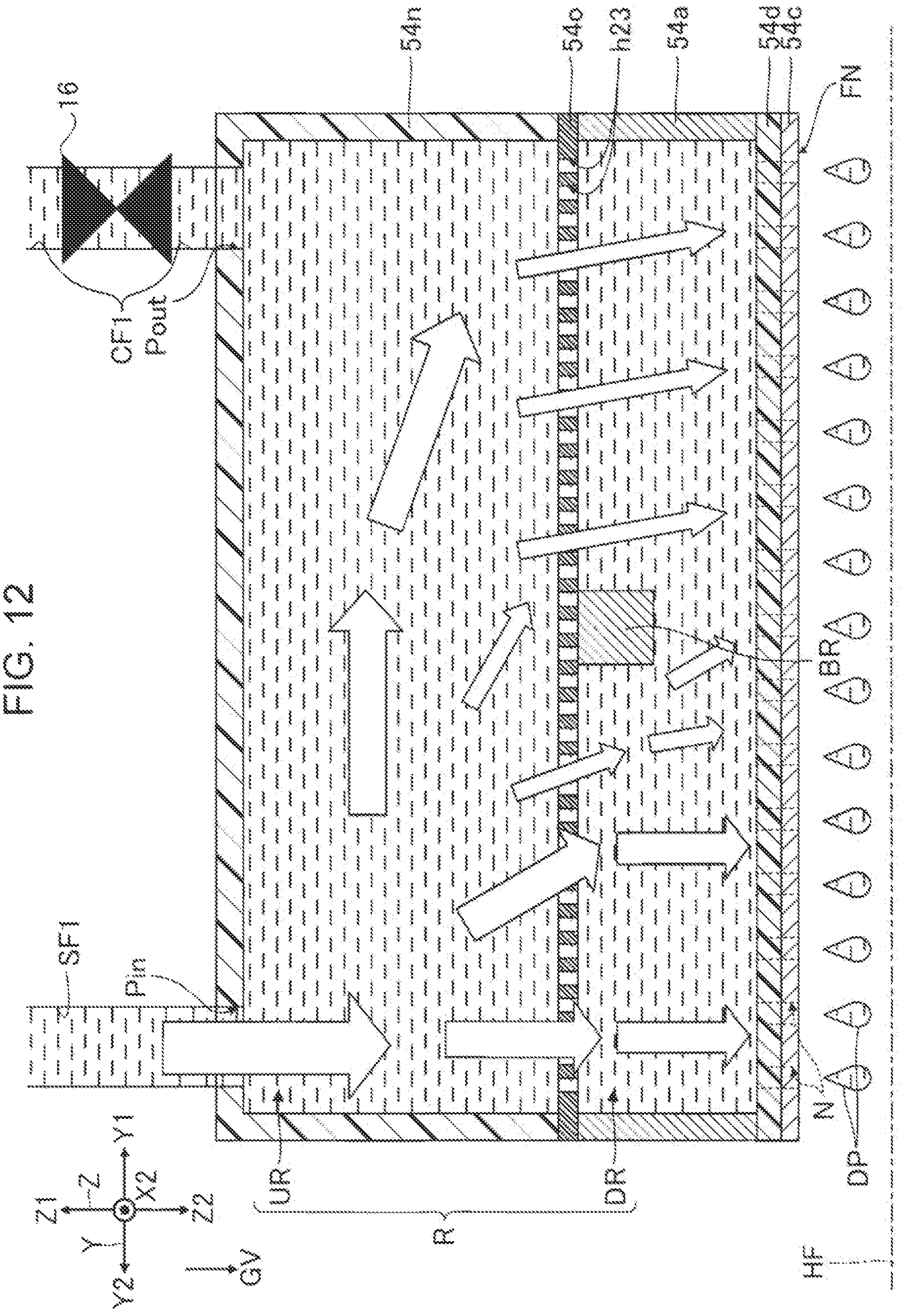
FIG. 12 is a view illustrating a flow of the ink inside the common liquid chamber while Step S10 is performed.

FIG. 12 is a view illustrating a flow of the ink inside the common liquid chamber R while Step S10 is performed. The amount of the ink discharged from the plurality of nozzles N by the second pressurization discharge operation may be smaller than the amount of the ink discharged from the plurality of nozzles N by the first pressurization discharge operation. The amount of the ink discharged from the plurality of nozzles N is a total amount of the ink discharged from each of the plurality of nozzles N. For example, the control module 20 sets a period required for the second pressurization discharge operation to be shorter than a period required for the first pressurization discharge operation. Since the second pressurization discharge operation is performed, a liquid level of the nozzle N disturbed by the preliminary ejection operation, that is, a meniscus can be adjusted.

After Step S10 is completed, the liquid ejecting apparatus 100 completes a series of processes illustrated in FIG. 10.

1-9. Summary of First Embodiment

As described above, the liquid ejecting apparatus 100 according to the first embodiment includes the plurality of nozzles N that eject the ink in the Z2-direction which is the ejection direction, the common liquid chamber R that communicates with the plurality of nozzles N and extends in the direction along the Y-axis orthogonal to the direction along the Z-axis, the filter 54*o* that partitions the common liquid chamber UR into the upstream chamber R and the downstream chamber DR, the inlet Pin for introducing the ink into the upstream chamber UR, the outlet Pout for causing the ink to flow out from the upstream chamber UR, the sub tank 151 capable of storing the ink, the supply flow path SF1 that causes the inlet Pin to communicate with the sub tank 151, and the recovery flow path CF1 that causes the outlet Pout to communicate with the sub tank 151. A beam portion BR that couples the pair of inner walls wDR defining the downstream chamber DR is provided inside the downstream chamber DR. The pair of inner walls wDR are separated in the direction along the X-axis intersecting with the direction along the Y-axis when viewed in the Z2-direction. The pressurization discharge operation for discharging the ink from the plurality of nozzles N by pressurizing the supply flow path SF1 and the first circulation operation for circulating the ink in the circulation path KJ including the sub tank 151, the supply flow path SF1, the common liquid chamber R, and the recovery flow path CF1, in order of the sub tank 151, the supply flow path SF1, the common liquid chamber R, the recovery flow path CF1, and the sub tank 151 are performed. In the filling process of filling the circulation path KJ with the ink, after the first circulation operation is performed, the preliminary ejection operation which is the air bubble moving operation for moving the ink inside the downstream chamber DR in the direction different from the direction in which the ink inside the downstream chamber DR is moved by the first circulation operation is performed. After the air bubble moving operation is performed, the pressurization discharge operation is performed.

In the air bubble moving operation, the ink inside the downstream chamber DR is moved in the direction different from the direction in which the ink inside the downstream chamber DR is moved by the first circulation operation. Therefore, the air bubbles BL staying in the region pinched between the beam portion BR and the filter 54*o* can be moved by the first circulation operation. The air bubbles BL can be discharged from the common liquid chamber R by moving the air bubbles BL. Therefore, it is possible to reduce a possibility that the air bubbles BL may remain in the common liquid chamber R after the pressurization discharge operation after the air bubble moving operation.

In addition, the liquid ejecting apparatus 100 forms an image on the medium PP by ejecting the ink onto the medium PP from all or a part of the plurality of nozzles N, and further includes a plurality of piezoelectric elements 54*f* each driven to eject the ink from the plurality of nozzles N. The filling process performs a pressurization discharge operation between the first circulation operation and the preliminary ejection operation. In the preliminary ejection operation, the ink that does not directly contribute to the image formation is ejected from all of the plurality of nozzles N.

Since a negative pressure can be generated in the downstream chamber DR by the preliminary ejection operation, the air bubbles BL staying in the region pinched between the beam portion BR and the filter 54*o* can be moved.

In addition, in the filling process, the amount of the ink discharged from the plurality of nozzles N by the second pressurization discharge operation performed after the preliminary ejection operation may be smaller than the amount of the ink discharged from the plurality of nozzles N by the first pressurization discharge operation performed between the first circulation operation and the preliminary ejection operation.

As described above, the second pressurization discharge operation is performed to adjust the meniscus. The amount of the ink required for adjusting the meniscus is smaller than the amount of the ink required for filling the plurality of nozzles N. Therefore, in the liquid ejecting apparatus 100 according to the first embodiment, compared to an aspect in which the amount of the ink discharged from the plurality of nozzles N by the second pressurization discharge operation is larger than the amount of the ink discharged from the plurality of nozzles N by the first pressurization discharge operation, while the meniscus is adjusted, the amount of the ink consumed in the filling process can be reduced.

2. Second Embodiment

In the filling process of the first embodiment, the preliminary ejection operation is performed for all of the plurality of nozzles N, but the present disclosure is not limited thereto. Hereinafter, a second embodiment will be described.

2-1. Filling Process According to Second Embodiment

Figure 13:
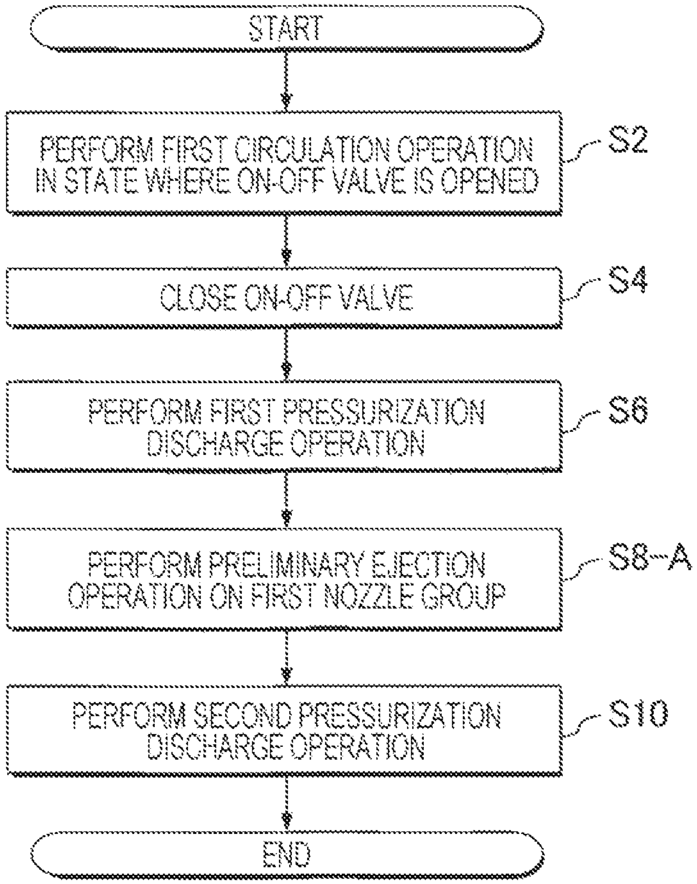
FIG. 13 is a view illustrating a flowchart illustrating a filling process according to a second embodiment.

FIG. 13 is a flowchart illustrating a filling process according to the second embodiment. The filling process according to the second embodiment is different from the filling process according to the first embodiment in that a process in Step S8-A is performed instead of a process in Step S8.

After Step S6 is completed, the liquid ejecting apparatus 100 according to the second embodiment performs the preliminary ejection operation for an end portion nozzle group in Step S8-A. In the second embodiment, the preliminary ejection operation for the end portion nozzle group corresponds to the air bubble moving operation. The end portion nozzle group will be described with reference to FIG. 14.

Figure 14:
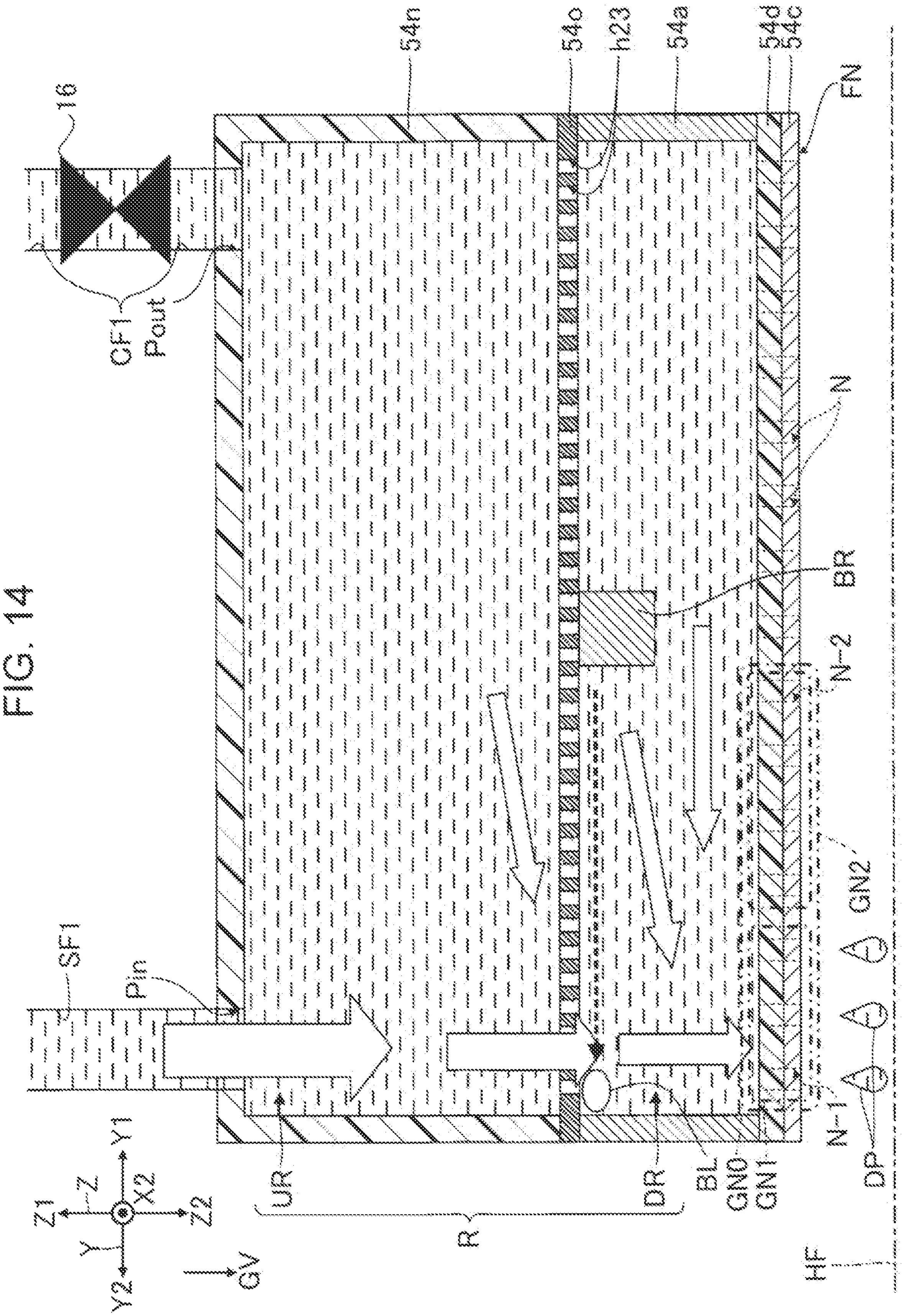
FIG. 14 is a view illustrating a flow of the ink inside the common liquid chamber while Step S8-A is performed.

FIG. 14 is a view illustrating a flow of the ink inside the common liquid chamber R while Step S8-A is performed. As illustrated in FIG. 14, the liquid ejecting apparatus 100 ejects the ink that does not directly contribute to the image formation from the plurality of nozzles N belonging to an end portion nozzle group GN1 in the plurality of nozzles N. The end portion nozzle group GN1 is located in an end portion of the plurality of nozzles N in the Y2-direction. The end portion nozzle group GN1 and a non-ejection nozzle group GN2 illustrated in FIG. 14 are nozzle groups obtained by dividing a nozzle group GN0 illustrated in FIG. 14 into two nozzle groups. The nozzle group GN0 is a nozzle group disposed closer to the inlet Pin than the beam portion BR in all of the plurality of nozzles N belonging to one nozzle row Ln of either the first nozzle row L1 or the second nozzle row L2 of the head chip 54 when viewed in the direction along the Z-axis. The end portion nozzle group GN1 includes a nozzle N-1 disposed closest to the inlet Pin in the nozzle group GN0. The non-ejection nozzle group GN2 includes a nozzle N-2 disposed closest to the beam portion BR in the nozzle group GN0. The end portion nozzle group GN1 corresponds to a "first nozzle group", and the non-ejection nozzle group GN2 corresponds to a "second nozzle group".

The number of nozzles belonging to the nozzle group GN0, the end portion nozzle group GN1, and the non-ejection nozzle group GN2 is two or more. The plurality of nozzles N belonging to the nozzle group GN0, the end portion nozzle group GN1, and the non-ejection nozzle group GN2 are continuously disposed along the Y-axis. Therefore, the end portion nozzle group GN1 is a nozzle group close to the inlet Pin in the two nozzle groups obtained by dividing the nozzle group GN0 by a plane parallel to the XZ-plane, and it can be said that the non-ejection nozzle group GN2 is a nozzle group close to the beam portion BR.

The control module 20 supplies the drive signal Com having the same content as the drive signal Com at the time of the flushing operation to the piezoelectric elements 54*f* corresponding to each of the plurality of nozzles N belonging to the end portion nozzle group GN1, and supplies the drive signal Com having a constant potential to the piezoelectric element 54*f* corresponding to each of the nozzles N that do not belong to the end portion nozzle group GN1. The nozzle N that does not belong to the end portion nozzle group GN1 includes the nozzle N belonging to the non-ejection nozzle group GN2.

The end portion of the downstream chamber DR in the Y2-direction has a negative pressure by ejecting the ink from the plurality of nozzles N belonging to the end portion nozzle group GN1. Therefore, the ink inside the downstream chamber DR can be moved in the Y2-direction. In the preliminary ejection operation for the end portion nozzle group GN1, which is the air bubble moving operation in the second embodiment, the ink is moved in the Y2-direction different from the Y1-direction in which the ink inside the downstream chamber DR is moved by the first circulation operation. In accordance with the flow of the ink in the Y2-direction, the air bubbles BL also move to the end portion of the downstream chamber DR in the Y2-direction.

In order to generate a force for moving the air bubbles BL to the end portion of the downstream chamber DR in the Y2-direction, one nozzle N belonging to the end portion nozzle group GN1 is not sufficient, and the plurality of nozzles N are required. On the other hand, as the number of the nozzles N belonging to the end portion nozzle group GN1 is small, that is, as the end portion nozzle group GN1 is closer to the Y2-direction, the air bubbles BL can be closer to the end portion of the downstream chamber DR in the Y2-direction. Therefore, compared to the preliminary ejection operation for all of the plurality of nozzles N, it is possible to reduce consumption of the ink. The number of the nozzles N belonging to the end portion nozzle group GN1 is set by an experiment or an experience of a developer of the liquid ejecting apparatus 100. For example, the number of the nozzles N belonging to the end portion nozzle group GN1 is smaller than half the number of the nozzles N belonging to the nozzle group GN0. Furthermore, the number of the nozzles N belonging to the end portion nozzle group GN1 may be smaller than one-third of the number of the nozzles N belonging to the nozzle group GN0 in some cases, or may be smaller than one-fourth in some cases.

After Step S8-A is completed, the liquid ejecting apparatus 100 performs the second pressurization discharge operation in Step S10.

Figure 15:
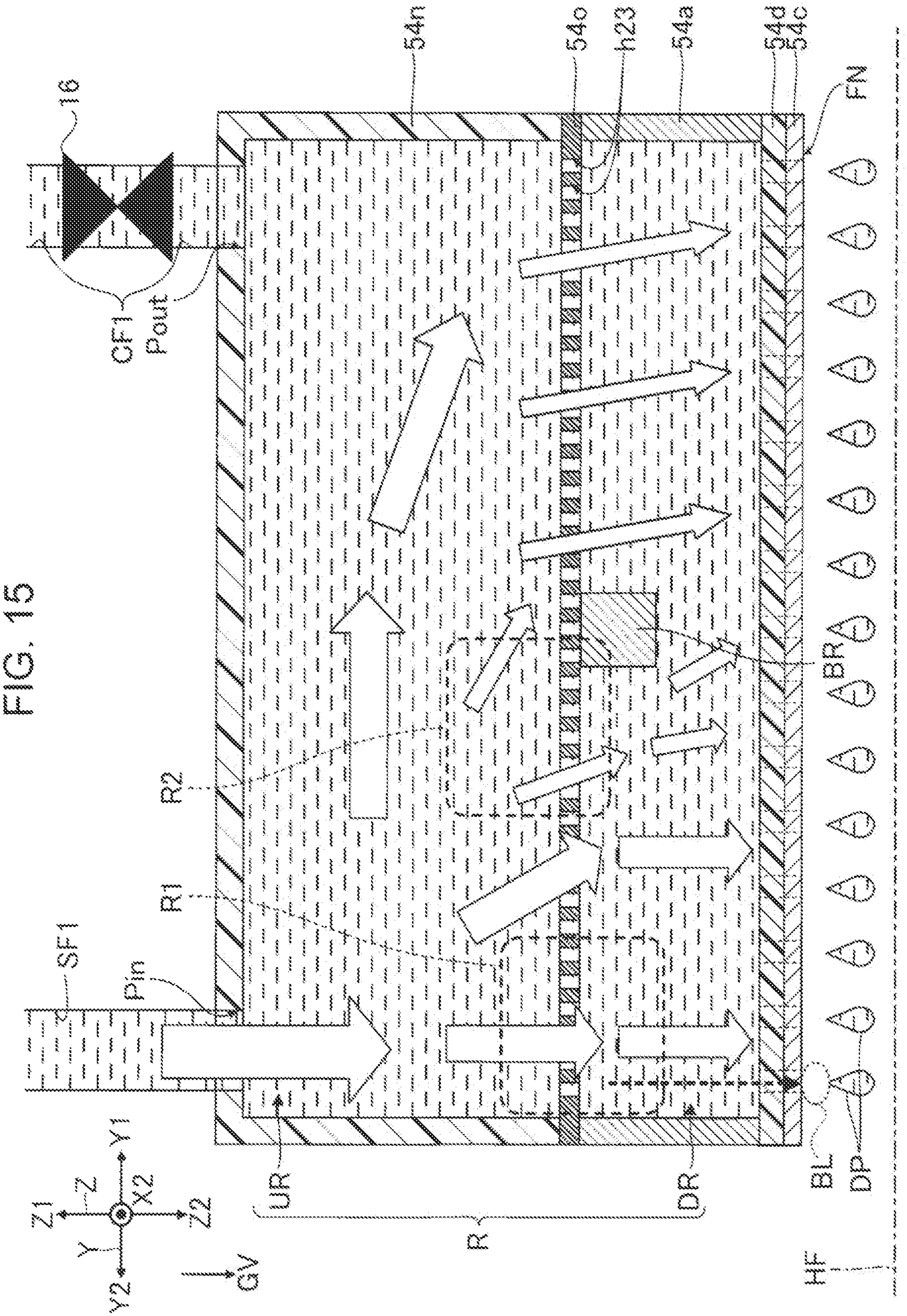
FIG. 15 is a view illustrating a flow of the ink inside the common liquid chamber while Step S10 is performed.

FIG. 15 is a view illustrating a flow of the ink inside the common liquid chamber R while Step S10 is performed. As illustrated in FIG. 15, in the pressurization discharge operation performed in Step S10, the flow of the ink inside the region R1 of the common liquid chamber R close to the inlet Pin is less likely to be dispersed, compared to the flow of the ink inside the region R2 close to the beam portion BR. More specifically, the wall surface of the common liquid chamber R exists in the Y2-direction of the region R1. Therefore, in the region R1, the ink flows in the Z2-direction along the wall surface. In contrast, the beam portion BR exists in the region R2. Therefore, the flow of the ink is dispersed in the Z2-direction and the Y1-direction by the beam portion BR. As a result that the flow of the ink is not dispersed, a force for moving the air bubbles BL in the Z2-direction inside the region R1 is greater than a force for moving the air bubbles BL in the Z2-direction inside the region R2. Therefore, in Step S10, the air bubbles BL can be moved in the Z2-direction, and the air bubbles BL can be discharged from the downstream chamber DR.

After Step S10 is completed, the liquid ejecting apparatus 100 completes a series of processes illustrated in FIG. 13.

2-2. Summary of Second Embodiment

As described above, in the second embodiment, the plurality of nozzles N are arranged in the direction along the Y-axis to form the nozzle row Ln. The inlet Pin is disposed in an end portion of the upstream chamber UR in the direction along the Y-axis. The nozzle group GN0 disposed closer to the inlet Pin than the beam portion BR in the plurality of nozzles N is divided into the end portion nozzle group GN1 including the nozzle N-1 closest to the inlet Pin and the non-ejection nozzle group GN2 including the nozzle N-2 closest to the beam portion BR. In the preliminary ejection operation as the air bubble moving operation, the ink that does not directly contribute to the image formation is ejected from the plurality of nozzles N belonging to the end portion nozzle group GN1.

The liquid ejecting apparatus 100 according to the second embodiment can move the air bubbles BL inside the downstream chamber DR to the end portion of the common liquid chamber R away from the beam portion BR by ejecting the ink from the plurality of nozzles N belonging to the end portion nozzle group GN1. Therefore, the air bubbles BL can be discharged by the pressurization discharge operation after the preliminary ejection operation. Furthermore, the liquid ejecting apparatus 100 according to the second embodiment performs the preliminary ejection operation only for the end portion nozzle group GN1 in the plurality of nozzles N. Therefore, compared to an aspect in which the preliminary ejection operation is performed for all of the plurality of nozzles N as in the first embodiment, it is possible to reduce consumption of the ink.

3. Third Embodiment

In the first embodiment and the second embodiment, the air bubbles BL inside the downstream chamber DR are moved by the preliminary ejection operation, but the present disclosure is not limited thereto. Hereinafter, a third embodiment will be described.

Figure 16:
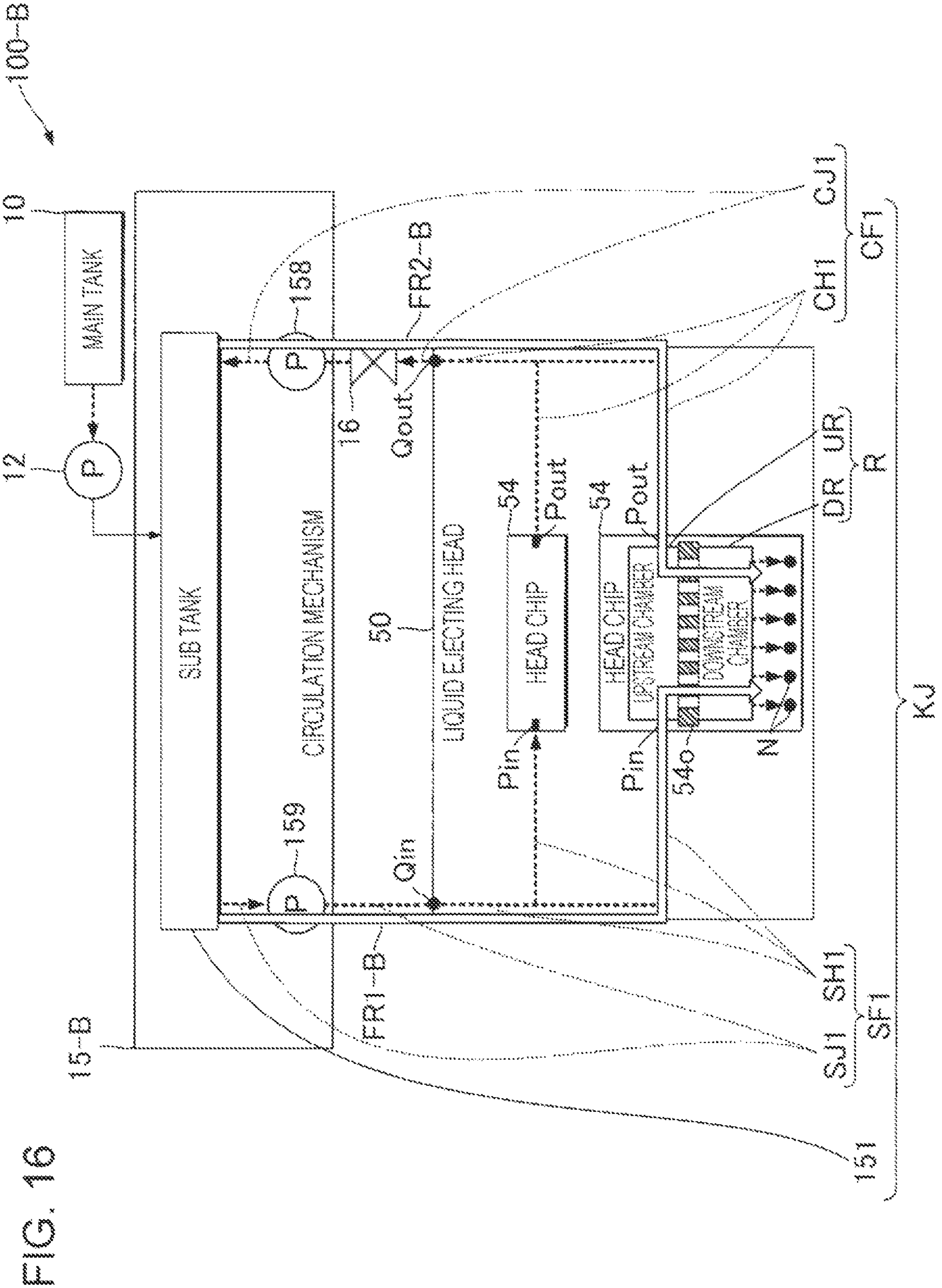
FIG. 16 is a view for describing a circulation mechanism and an on-off valve according to a third embodiment.

3-1. Configuration of Liquid Ejecting Apparatus 100-B According to Third Embodiment FIG. 16 is a view for describing a circulation mechanism 15-B and the on-off valve 16 according to the third embodiment. The liquid ejecting apparatus 100-B according to the third embodiment is different from the liquid ejecting apparatus 100 in that the circulation mechanism 15-B is provided instead of the circulation mechanism 15. The circulation mechanism 15-B is different from the circulation mechanism 15 in that a pump 158 is provided. The pump 158 is provided in an intermediate portion of the in-device recovery flow path CJ1. In addition, as illustrated in FIG. 16, the pump 158 is provided between the sub tank 151 and the on-off valve 16.

In the first circulation operation, the pump 158 generates a negative pressure with respect to the outlet Pout. In this manner, the ink can be circulated faster, compared to the liquid ejecting apparatus 100 according to the first embodiment.

Furthermore, in the pressurization discharge operation, the supply flow path SF1 is pressurized by the pump 159, and the recovery flow path CF1 is pressurized by the pump 158 to generate a flow FR1-B in which the ink flows in order of the supply flow path SF1, the common liquid chamber R, and the plurality of nozzles N and a flow FR2-B in which the ink flows in order of the recovery flow path CF1, the common liquid chamber R, and the plurality of nozzles N. The liquid ejecting apparatus 100-B according to the third embodiment generates the flow FR1-B and the flow FR2-B. In this manner, a larger ink flow can be generated, compared to the liquid ejecting apparatus 100 according to the first embodiment. Therefore, more air bubbles can be discharged in the pressurization discharge operation.

Furthermore, in the liquid ejecting apparatus 100-B, the pump 159 stops pressurizing the supply flow path SF1, and the pump 158 pressurizes the recovery flow path CF1. In this manner, it is possible to perform the second circulation operation for circulating the ink in a direction opposite to the direction in which the ink is moved by the first circulation operation. Specifically, in the second circulation operation, the ink is circulated in the circulation path KJ in order of the sub tank 151, the recovery flow path CF1, the common liquid chamber R, the supply flow path SF1, and the sub tank 151. For example, when the pump 158 and the pump 159 are tube pumps, the supply flow path SF1 may be decompressed by rotating the pump 159 in the opposite direction in the second circulation operation. In this manner, the ink may be circulated faster.

3-2. Filling Process According to Third Embodiment

Figure 17:
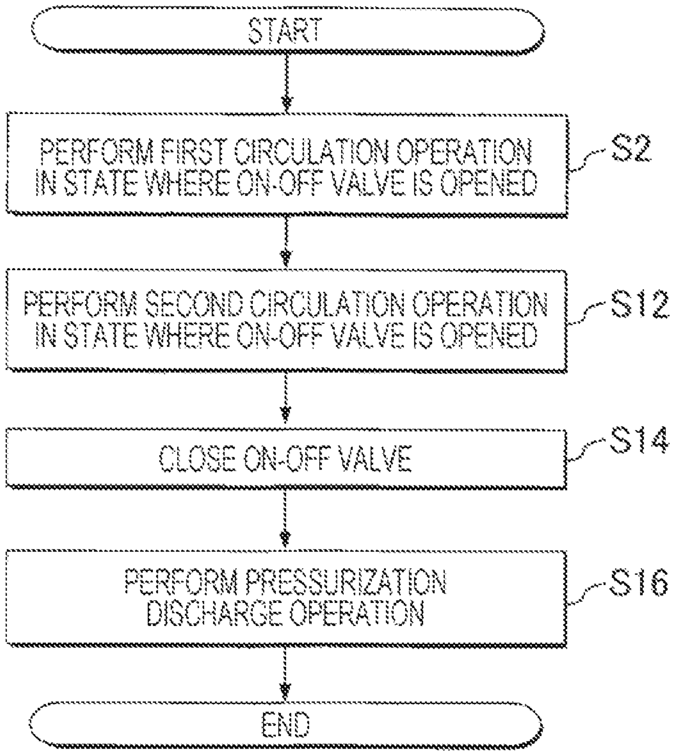
FIG. 17 is a view illustrating a flowchart illustrating a filling process according to the third embodiment.

FIG. 17 is a flowchart illustrating a filling process according to a third embodiment. In the filling process according to the third embodiment, a process after the process in Step S2 is different from the filling process according to the first embodiment.

After Step S2 is completed, the liquid ejecting apparatus 100-B performs the second circulation operation in Step S12 in a state where the on-off valve 16 is open. In the third embodiment, the second circulation operation corresponds to the air bubble moving operation.

Figure 18:
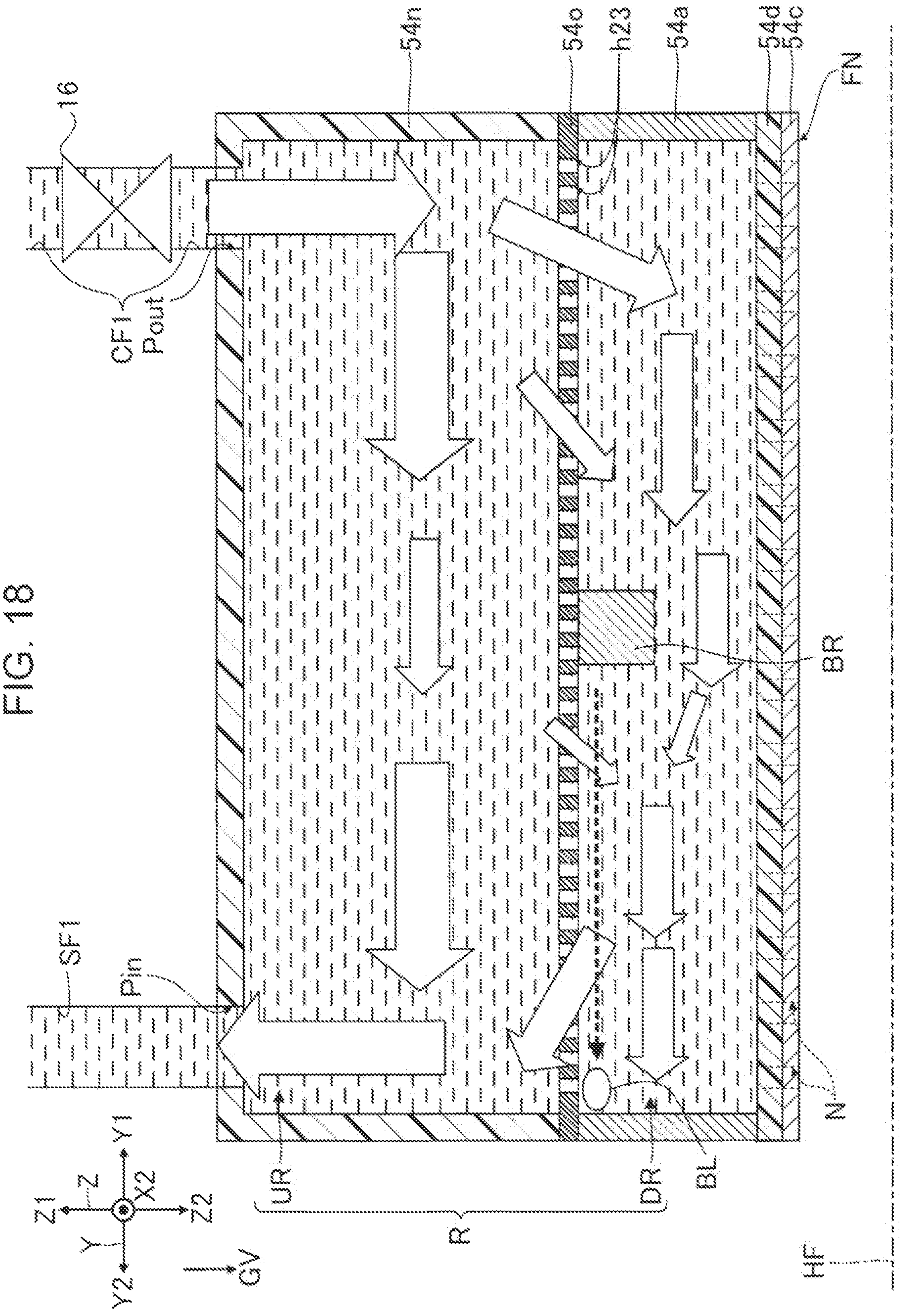
FIG. 18 is a view illustrating a flow of the ink inside the common liquid chamber while Step S12 is performed.

FIG. 18 is a view illustrating a flow of the ink inside the common liquid chamber R while Step S12 is performed. As illustrated in FIG. 18, a direction in which the ink inside the downstream chamber DR is moved by the second circulation operation is the Y2-direction different from the Y1-direction which is the direction in which the ink inside the downstream chamber DR is moved by the first circulation operation. As illustrated in FIG. 18, the ink inside the downstream chamber DR is moved in the Y2-direction by the second circulation operation. Therefore, the air bubbles BL can also be moved in the Y2-direction, and can be moved to the end portion of the downstream chamber DR in the Y2-direction.

An object of performing the second circulation operation is only to move the air bubbles BL pinched between the beam portion BR and the filter 54*o* to the end portion of the downstream chamber DR in the Y2-direction. Therefore, a period during which the second circulation operation is performed may be shorter than a period during which the first circulation operation performed in Step S2 is performed.

After Step S12 is completed, the liquid ejecting apparatus 100 closes the on-off valve 16 in Step S14, and performs the pressurization discharge operation in Step S16. The flow of the ink inside the common liquid chamber R while Step S16 is performed is substantially the same as the flow of the ink inside the common liquid chamber R while the second pressurization discharge operation of the second embodiment is performed, which is illustrated in FIG. 15. Therefore, the illustration will be omitted.

As in the second pressurization discharge operation for the second embodiment, in the pressurization discharge operation performed in Step S16, compared to the flow of the ink inside the region R2 close to the beam portion BR, the flow of the ink inside the region R1 close to the inlet Pin in the common liquid chamber R is less likely to be dispersed. In Step S16, the air bubbles BL can also be moved in the Z2-direction, and can be discharged from the downstream chamber DR.

3-3. Summary of Third Embodiment

As described above, the air bubble moving operation in the third embodiment is the second circulation operation for circulating the liquid in the direction opposite to the direction in the first circulation operation.

The liquid ejecting apparatus 100-B according to the third embodiment can move the air bubbles BL inside the downstream chamber DR to the end portion close to the inlet Pin of the downstream chamber DR away from the beam portion BR. Therefore, the air bubbles BL can be discharged from the downstream chamber DR by the pressurization discharge operation after the second circulation operation.

In addition, the period during which the second circulation operation is performed is shorter than the period during which the first circulation operation is performed.

In the liquid ejecting apparatus 100-B according to the third embodiment, compared to an aspect in which the period during which the second circulation operation is performed is longer than the period during which the first circulation operation is performed, while the air bubbles BL are discharged from the downstream chamber DR, it is possible to shorten the period during which the filling process is performed.

4. Modification Examples

Each form described above as an example can be modified in various ways. Specific modification aspects will be described below as examples. Any two or more aspects selected from the following examples can be combined as appropriate within a mutually consistent range.

4-1. First Modification Example

In each of the above-described aspects, the Z2-direction coincides with the gravity direction GV, but the present disclosure is not limited thereto.

Figure 19:
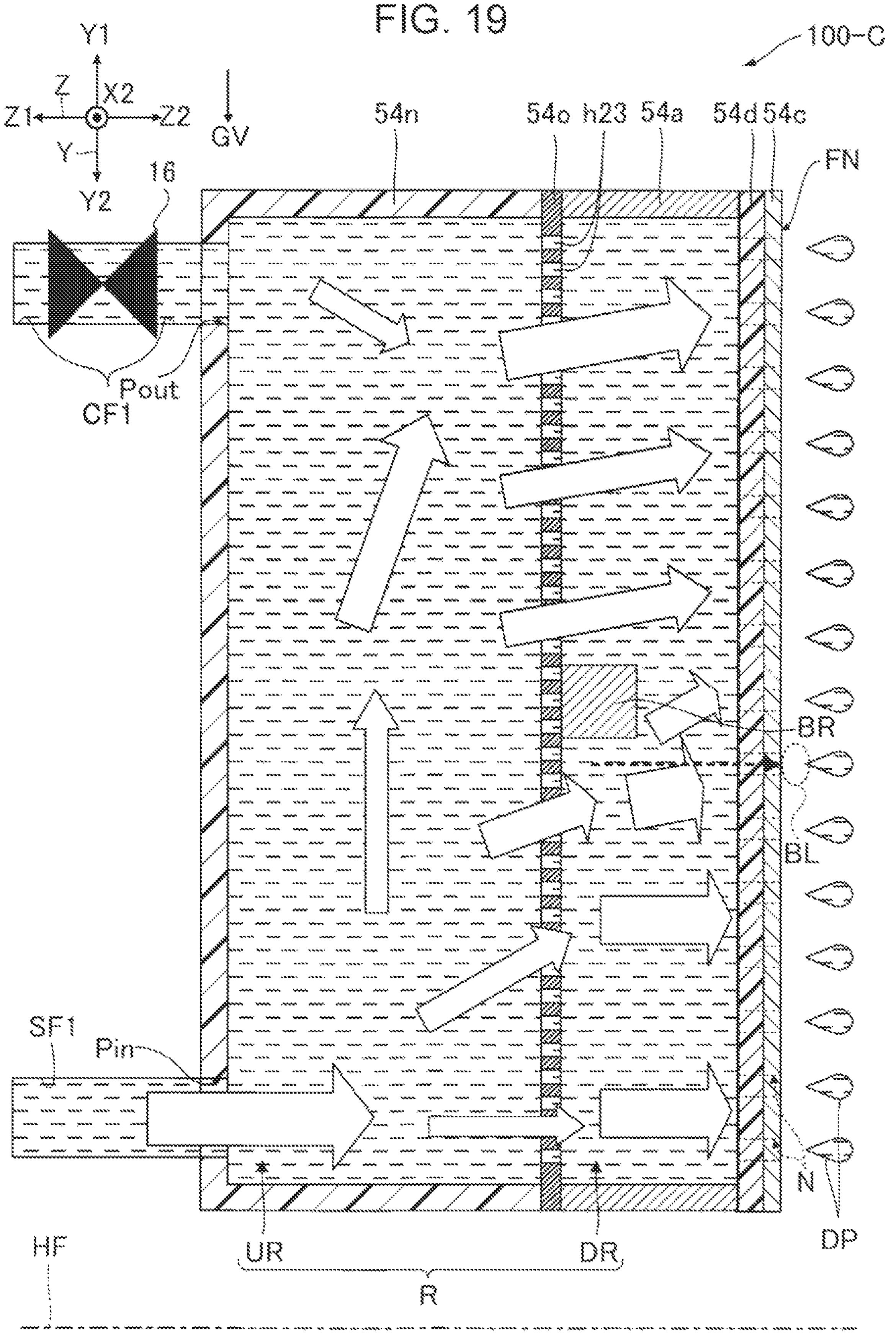
FIG. 19 is a view illustrating a flow of the ink inside the common liquid chamber while a preliminary ejection operation is performed in a liquid ejecting apparatus according to a first modification example.

FIG. 19 is a view illustrating a flow of the ink inside the common liquid chamber R while the preliminary ejection operation is performed in a liquid ejecting apparatus 100-C according to a first modification example. The liquid ejecting apparatus 100-C is different from the liquid ejecting apparatus 100 according to the first embodiment in that the Y2-direction coincides with the gravity direction GV. Therefore, in the first modification example, the nozzle surface FN is inclined by 90 degrees with respect to the horizontal plane HF. In other words, in the common liquid chamber R according to the first modification example, the liquid ejecting apparatus 100-C can be used in a state where the common liquid chamber R according to the first embodiment is rotated counterclockwise around the X-axis as the central axis by 90 degrees when viewed in the X2-direction from the X1-direction.

In the first modification example, the filling process according to the first embodiment illustrated in FIG. 10 is performed. FIG. 19 illustrates a flow of the ink inside the common liquid chamber R while the preliminary ejection operation which is the process in Step S8 is performed. The air bubbles BL pinched between the filter 54*o* and the beam portion BR in Step S6 is moved in the Z2-direction by the preliminary ejection operation in Step S8, and is discharged from the nozzle N. As described above, the liquid ejecting apparatus 100-C according to the first modification example can reduce the air bubbles BL staying in the downstream chamber DR by performing the preliminary ejection operation according to the first embodiment.

In addition, in the first modification example, an aspect has been described in which the liquid ejecting apparatus 100-C is used in a state where the common liquid chamber R is rotated counterclockwise around the X-axis as the central axis by 90 degrees when viewed in the X2-direction from the X1-direction. However, the aspect in which the liquid ejecting apparatus 100 is used is not limited to the first modification example. For example, even in an aspect in which the liquid ejecting apparatus 100 is used in a state where the common liquid chamber R is rotated counterclockwise around the X-axis as the central axis by an angle larger than zero degrees and smaller than 90 degrees when viewed in the X2-direction from the X1-direction, it is possible to reduce the air bubbles BL staying in the downstream chamber DR by performing the preliminary ejection operation according to the first embodiment.

4-2. Second Modification Example

In the first embodiment to the third embodiment, the distances between the inlet Pin and the outlet Pout from the horizontal plane HF are the same, and in the first modification example, the distance from the horizontal plane HF to the inlet Pin is shorter than the distance from the horizontal plane HF to the outlet Pout. However, the distance from the horizontal plane HF to the inlet Pin may be longer than the distance from the horizontal plane HF to the outlet Pout.

Figure 20:
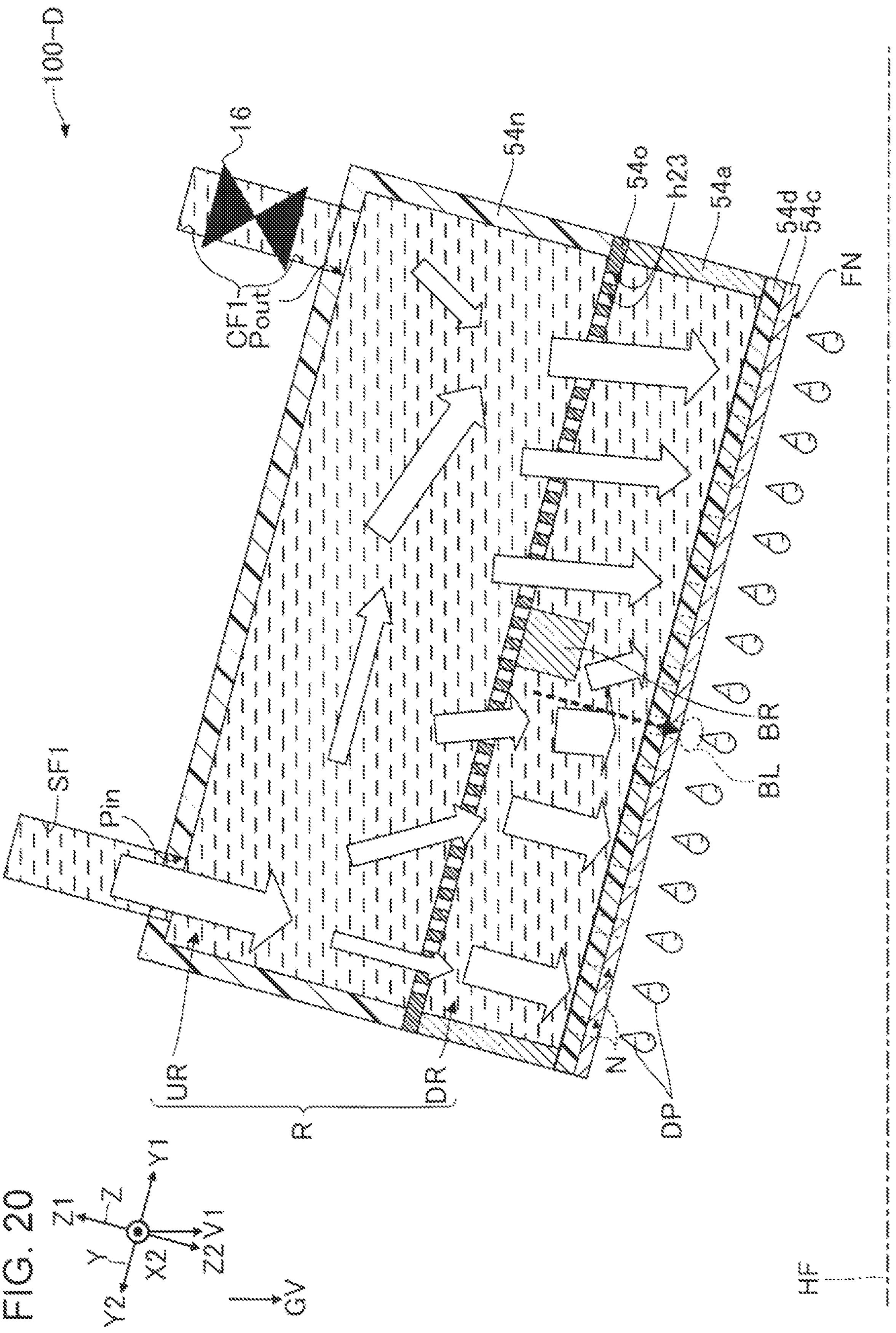
FIG. 20 is a view illustrating a flow of the ink inside the common liquid chamber while a pressurization discharge operation is performed in a liquid ejecting apparatus according to a second modification example.

FIG. 20 is a view illustrating a flow of the ink inside the common liquid chamber R while the pressurization discharge operation is performed in a liquid ejecting apparatus 100-D according to a second modification example. The liquid ejecting apparatus 100-D is different from the liquid ejecting apparatus 100 according to the first embodiment in that a V1-direction orthogonal to the X-axis and obtained by rotating the Z2-direction counterclockwise by 15 degrees when viewed in the X2-direction from the X1-direction coincides with the gravity direction GV. FIG. 20 illustrates a state where the liquid ejecting apparatus 100-D is used in a state where the common liquid chamber R is rotated clockwise around the X-axis as the central axis by 15 degrees when viewed in the X2-direction from the X1-direction.

In the second modification example, the filling process according to the first embodiment illustrated in FIG. 10 is performed. In the second modification example, in some cases, a force for moving the air bubbles in the Y1-direction by the first circulation operation may be greater than a force of moving the air bubbles in the Y2-direction by the buoyant force. However, in the liquid ejecting apparatus 100-D according to the second modification example, the air bubbles BL pinched between the filter 54*o* and the beam portion BR in Step S6 are moved in the Z2-direction by the preliminary ejection operation in Step S8, and are discharged from the nozzle N. As described above, the liquid ejecting apparatus 100-D according to the second modification example can reduce the air bubbles BL staying in the downstream chamber DR by performing the preliminary ejection operation according to the first embodiment.

In addition, in FIG. 20, although the liquid ejecting apparatus 100-D performs the filling process according to the first embodiment, the filling process according to the second embodiment may be performed, or the filling process according to the third embodiment may be performed. When the liquid ejecting apparatus 100-D performs the filling process according to the second embodiment or the filling process according to the third embodiment, the air bubbles BL are moved in the Y2-direction, and thereafter, are moved in the Z2-direction to be discharged from the inside of the downstream chamber DR.

In addition, in the second modification example, an aspect has been described in which the liquid ejecting apparatus 100-D is used in a state where the common liquid chamber R is rotated clockwise around the X-axis as the central axis by 15 degrees when viewed in the X2-direction from the X1-direction. However, the aspect of using the liquid ejecting apparatus 100 is not limited to the second modification example. For example, in an aspect in which the liquid ejecting apparatus 100 is used in a state where the common liquid chamber R is rotated around the X-axis as the central axis by an angle larger than zero degrees and smaller than 15 degrees clockwise when viewed in the X2-direction from the X1-direction, compared to the aspect of performing the pressurization discharge operation after the circulation operation is performed, it is possible to reduce the possibility that the air bubbles may remain in the common liquid chamber R after the circulation operation.

4-3. Third Modification Example

In the first modification example and the second modification example, the aspect has been described in which the liquid ejecting apparatus 100 is used in a state where the common liquid chamber R is rotated around the X-axis as the central axis. However, the aspect of using the liquid ejecting apparatus 100 is not limited thereto. For example, even in an aspect in which the liquid ejecting apparatus 100 is used in a state where the common liquid chamber R is rotated around the Y-axis as the central axis, it is possible to reduce the air bubbles in the downstream chamber DR which stay in the first circulation operation.

Figure 21:
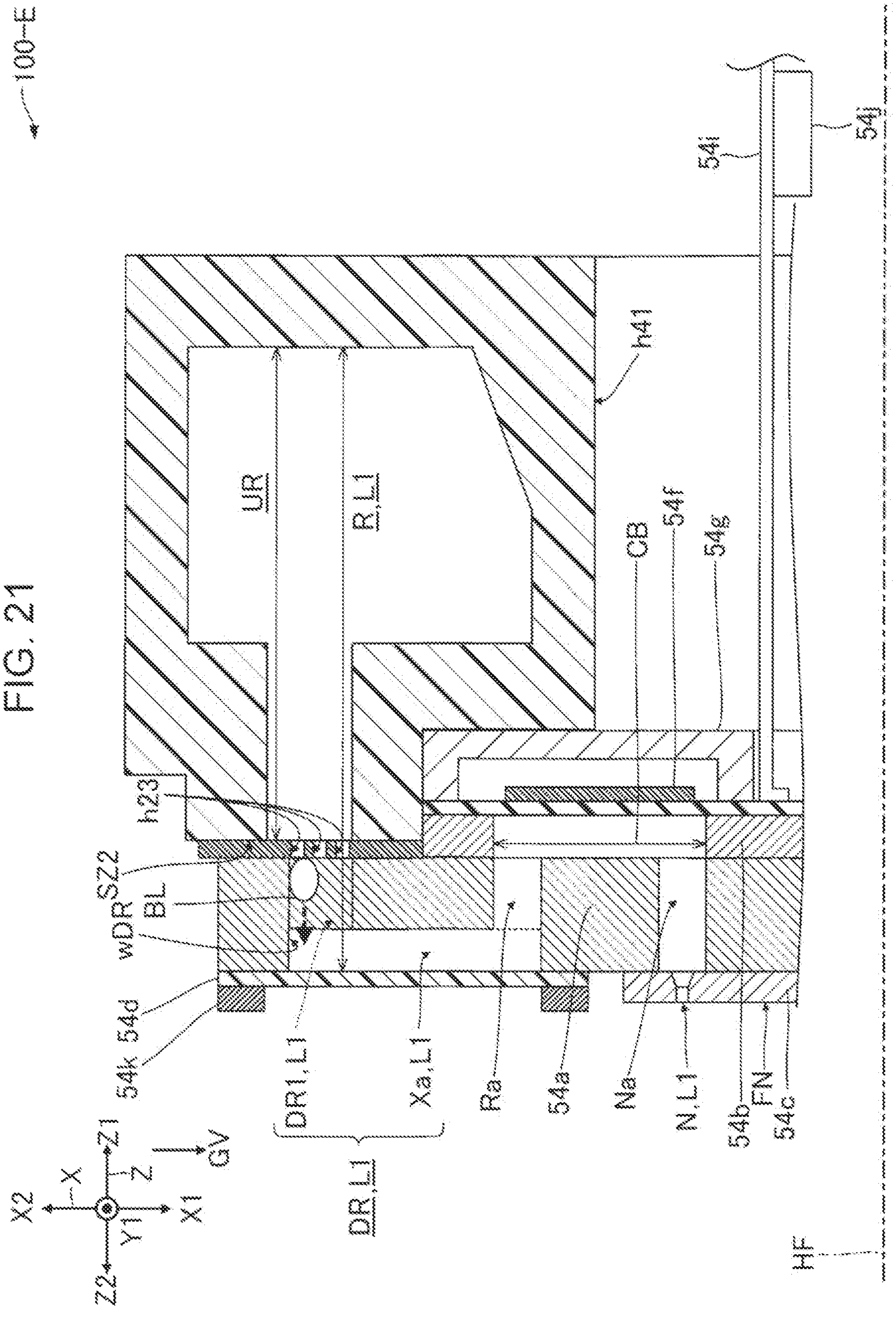
FIG. 21 is a view for describing a liquid ejecting apparatus according to a third modification example.

FIG. 21 is a view for describing a liquid ejecting apparatus 100-E according to a third modification example. However, in FIG. 21, the head chip 54 according to the third modification example is illustrated only in the X2-direction of the wiring substrate 54*i*, in a cross section parallel to the XZ-plane and cut along the plane passing through the beam portion BR. The liquid ejecting apparatus 100-E is different from the liquid ejecting apparatus 100 according to the first embodiment in that the X1-direction coincides with the gravity direction GV. FIG. 21 illustrates an aspect in which the liquid ejecting apparatus 100-E is used in a state where the common liquid chamber R is rotated clockwise around the Y-axis as the central axis by 90 degrees when viewed in the Y1-direction from the Y2-direction.

In the third modification example, the filling process according to the first embodiment illustrated in FIG. 10 is performed. The air bubbles BL pinched between the filter 54*o* and the beam portion BR in Step S6 is moved in the Z2-direction by the preliminary ejection operation in Step S8, and is discharged from the nozzle N. As described above, the liquid ejecting apparatus 100-C according to the third modification example can reduce the air bubbles BL staying in the downstream chamber DR by performing the preliminary ejection operation according to the first embodiment.

In addition, in FIG. 21, although the liquid ejecting apparatus 100-E performs the filling process according to the first embodiment, the filling process according to the second embodiment may be performed, or the filling process according to the third embodiment may be performed.

4-4. Fourth Modification Example

In each of the above-described aspects, a gap is not formed between the filter 54*o* and the beam portion BR in the direction along the Z-axis, but the gap may be formed.

Figure 22:
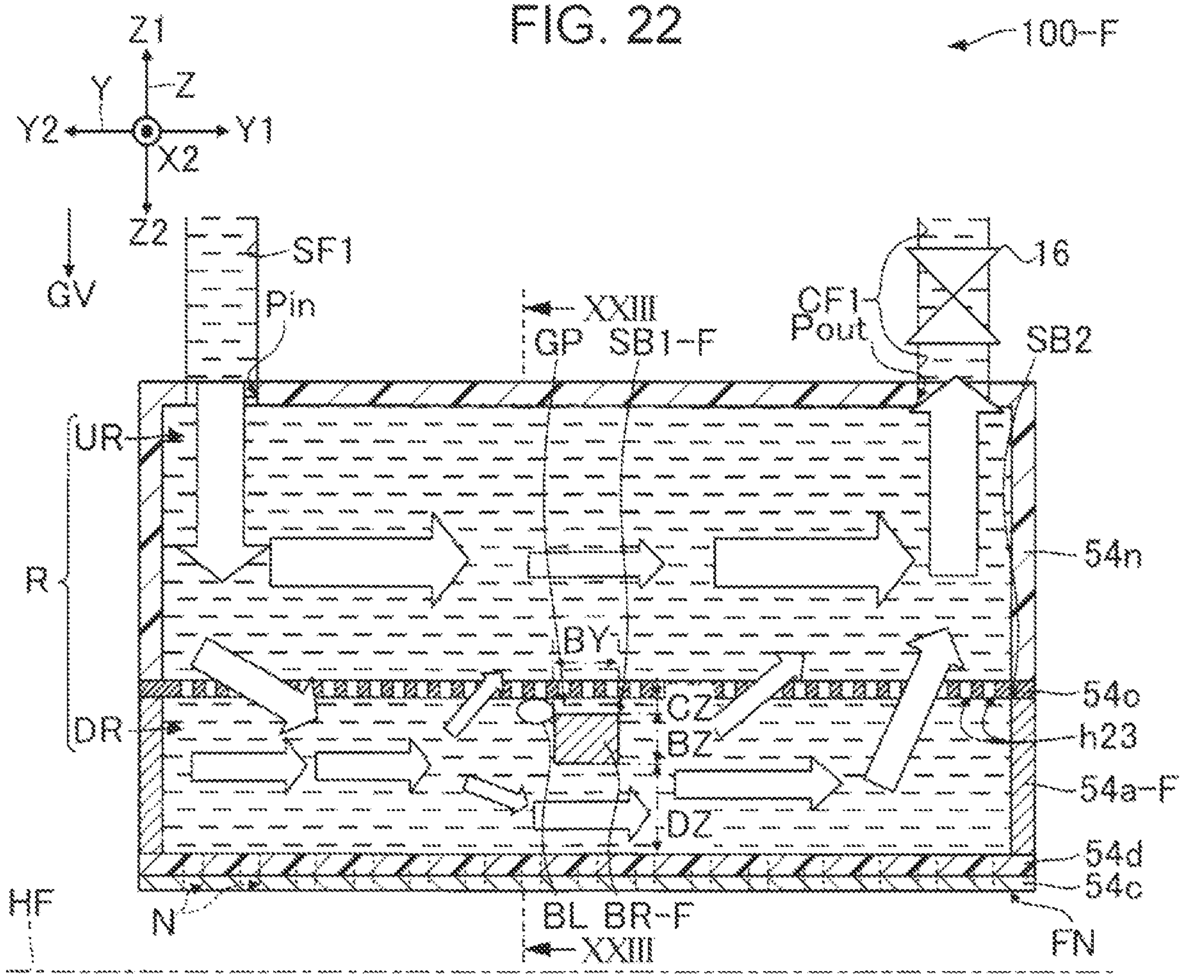
FIG. 22 is a view for describing a liquid ejecting apparatus according to a fourth modification example.
Figure 23:
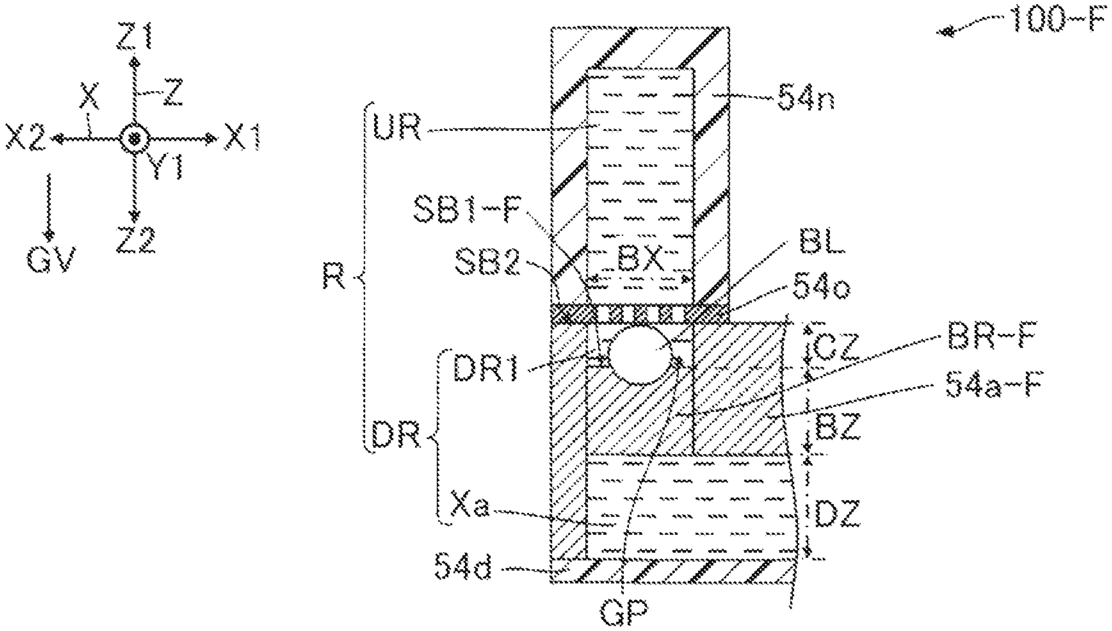
FIG. 23 is a cross-sectional view taken along line XXIII-XXIII in FIG. 22.

FIG. 22 is a view for describing a liquid ejecting apparatus 100-F according to a fourth modification example. FIG. 23 is a cross-sectional view taken along line XXIII-XXIII in FIG. 22. The head chip 54 according to the fourth modification example is different from the head chip 54 according to the first embodiment in that a flow path forming member 54*a*-F is provided instead of the flow path forming member 54*a*. The flow path forming member 54*a*-F is different from the flow path forming member 54*a* in that a beam portion BR-F is provided instead of the beam portion BR.

As illustrated in FIGS. 22 and 23, a surface SB1-F of the beam portion BR-F facing the case 54*n* is located in the Z2-direction with respect to a surface SB2 of the flow path forming member 54*a* facing the case 54*n*. Therefore, a gap GP is formed between the filter 54*o* and the beam portion BR-F in the direction along the Z-axis.

As illustrated in FIGS. 22 and 23, the liquid ejecting apparatus 100-F according to the fourth modification example has the gap GP. When a dimension CZ of the gap GP in the direction along the Z-axis is shorter than at least any one of a distance DZ between the beam portion BR-D and the bottom surface of the downstream chamber DR, a dimension BX of the beam portion BR-D in the direction along the X-axis, a dimension BZ of the beam portion BR-D in the direction along the Z-axis, and a dimension BY of the beam portion BR-D in the direction along the Y-axis, the air bubbles are less likely to pass through the gap GP. As a result, as illustrated in FIGS. 22 and 23, in some cases, the air bubbles BL may grow, and the air bubbles BL may stay inside the downstream chamber DR.

Therefore, the liquid ejecting apparatus 100-F according to the fourth modification example performs any one filling process of the filling process according to the first embodiment, the filling process according to the second embodiment, and the filling process according to the third embodiment. In this manner, the air bubbles BL can be prevented from staying inside the downstream chamber DR.

4-5. Fifth Modification Example

The common liquid chamber R according to each of the above-described aspects is provided with one inlet Pin and one outlet Pout, but the present disclosure is not limited thereto.

Figure 24:
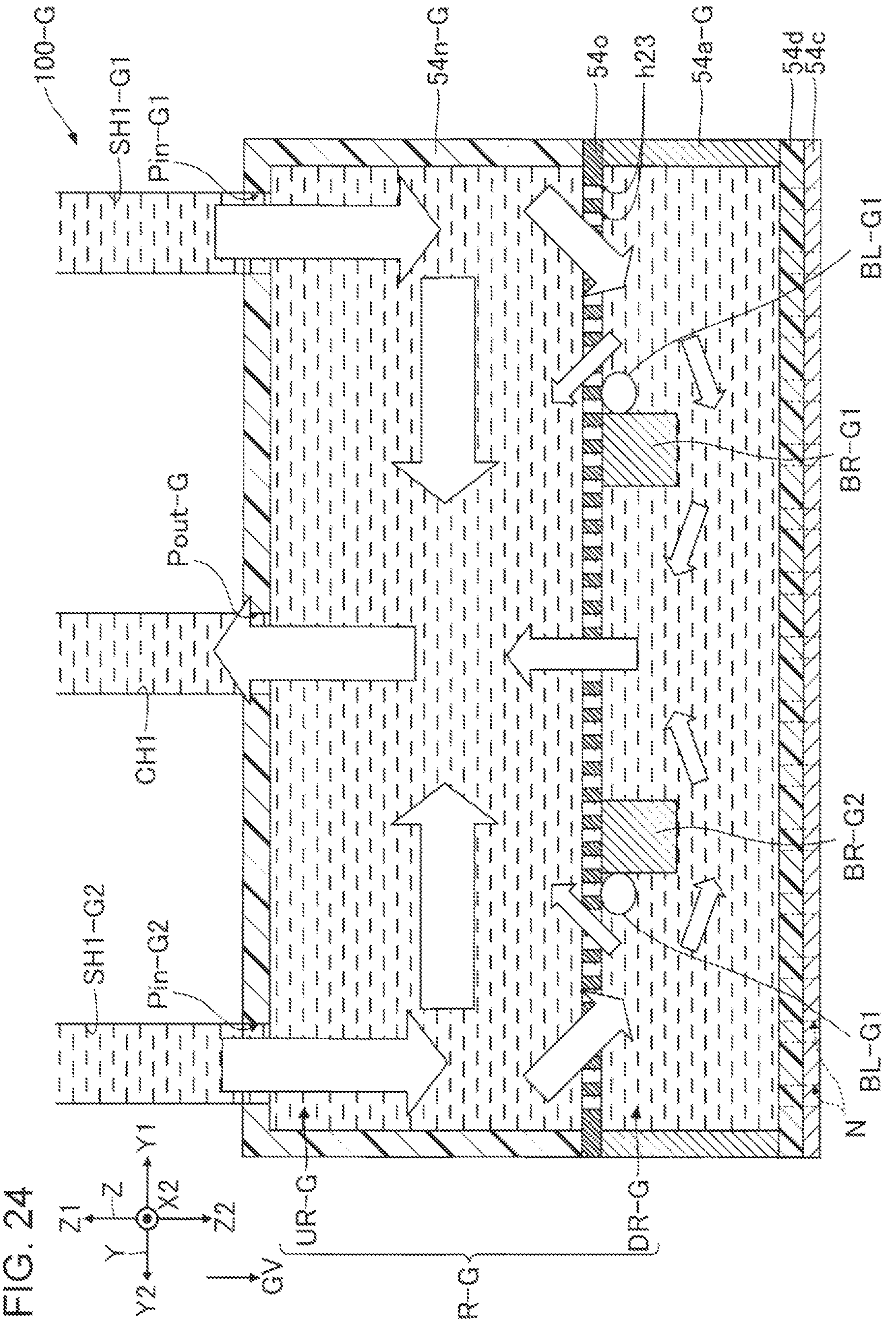
FIG. 24 is a view for describing a liquid ejecting apparatus according to a fifth modification example.

FIG. 24 is a view for describing a liquid ejecting apparatus 100-G according to a fifth modification example. The liquid ejecting apparatus 100-G is different from the liquid ejecting apparatus 100 according to the first embodiment in that a case 54*n*-G is provided instead of the case 54*n* and the head chip 54 having a flow path forming member 54*a*-G is provided instead of the flow path forming member 54*a*. A common liquid chamber R-G is formed by the case 54*n*-G and the flow path forming member 54*a*-G. The common liquid chamber R-G is different from the common liquid chamber R in that an upstream chamber UR-G is provided instead of the upstream chamber UR and a downstream chamber DR-G is provided instead of the downstream chamber DR.

The case 54*n*-G is different from the case 54*n* in that the case 54*n*-G is provided with an inlet Pin-G1 and an inlet Pin-G2 instead of the inlet Pin and is provided with an outlet Pout-G instead of the outlet Pout. Hereinafter, in some cases, the inlet Pin-G1 and the inlet Pin-G2 may be collectively referred to as an inlet Pin-G. As illustrated in FIG. 21, the inlet Pin-G1 is provided in an end portion of the upstream chamber UR-G in the Y1-direction. The inlet Pin-G2 is provided in an end portion of the upstream chamber UR-G in the Y2-direction. The outlet Pout-G is provided between the inlet Pin-G1 and the inlet Pin-G2, and more specifically, is provided in the vicinity of the center of the upstream chamber UR-G.

As illustrated in FIG. 24, the inlet Pin-G1 is coupled to the in-head supply flow path SH1-G1, and the inlet Pin-G2 is coupled to the in-head supply flow path SH1-G2. The in-head supply flow path SH1-G1 and the in-head supply flow path SH1-G2 are flow paths inside the liquid ejecting head 50 according to the fifth modification example, and are flow paths provided instead of the in-head supply flow path SH1. Each of the in-head supply flow path SH1-G1 and the in-head supply flow path SH1-G2 is coupled to a main-stream portion coupled to the head inlet Qin. The outlet Pout-G is coupled to the in-head recovery flow path CH1.

The flow path forming member 54*a*-G is different from the flow path forming member 54*a* in that the beam portion BR-G1 and the beam portion BR-G2 are provided instead of the beam portion BR in the flow path forming member 54*a*-G. As understood from FIG. 24, the beam portion BR-G1 is provided between the inlet Pin-G1 and the outlet Pout-G when viewed in the direction along the Z-axis. The beam portion BR-G2 is provided between the inlet Pin-G2 and the outlet Pout-G when viewed in the direction along the Z-axis.

FIG. 24 illustrates a flow of the ink in the first circulation operation in the fifth modification example. As illustrated in FIG. 24, the ink supplied from the inlets Pin-G provided in each of both end portions of the upstream chamber UR-G in the direction along the Y-axis is discharged from the outlet Pout-G provided at the center of the upstream chamber UR-G. Furthermore, in the ink supplied from the inlet Pin-G, the ink flowing into the downstream chamber DR-G via the filter 54*o* is also discharged from the outlet Pout-G at the center of the downstream chamber DR-G via the upstream chamber UR-G.

In the fifth modification example, the liquid ejecting apparatus 100-G performs the filling process according to the first embodiment illustrated in FIG. 10. The ink flows from each inlet Pin-G to the outlet Pout-G by the first circulation operation. Therefore, there is a possibility that air bubbles BL-G1 and BL-G2 may stay as illustrated in FIG. 24. The air bubbles BL-G1 are located in the Y1-direction with respect to the beam portion BR-G1, and are pinched between the beam portion BR-G1 and the filter 54*o*. The air bubbles BL-G2 are located in the Y2-direction with respect to the beam portion BR-G2, and are pinched between the beam portion BR-G2 and the filter 54*o*.

In the liquid ejecting apparatus 100-G, the preliminary ejection operation according to the first embodiment is performed after the first circulation operation. In this manner, the air bubbles BL-G1 and BL-G2 can be moved in the Z2-direction, and the air bubbles BL-G1 and BL-G2 can be discharged from the downstream chamber DR-G.

In addition, the liquid ejecting apparatus 100-G according to the fifth modification example may perform the filling process according to the second embodiment or the filling process according to the third embodiment instead of the filling process according to the first embodiment. An aspect in which the liquid ejecting apparatus 100-G performs the filling process according to the second embodiment will be described with reference to FIG. 25.

Figure 25:
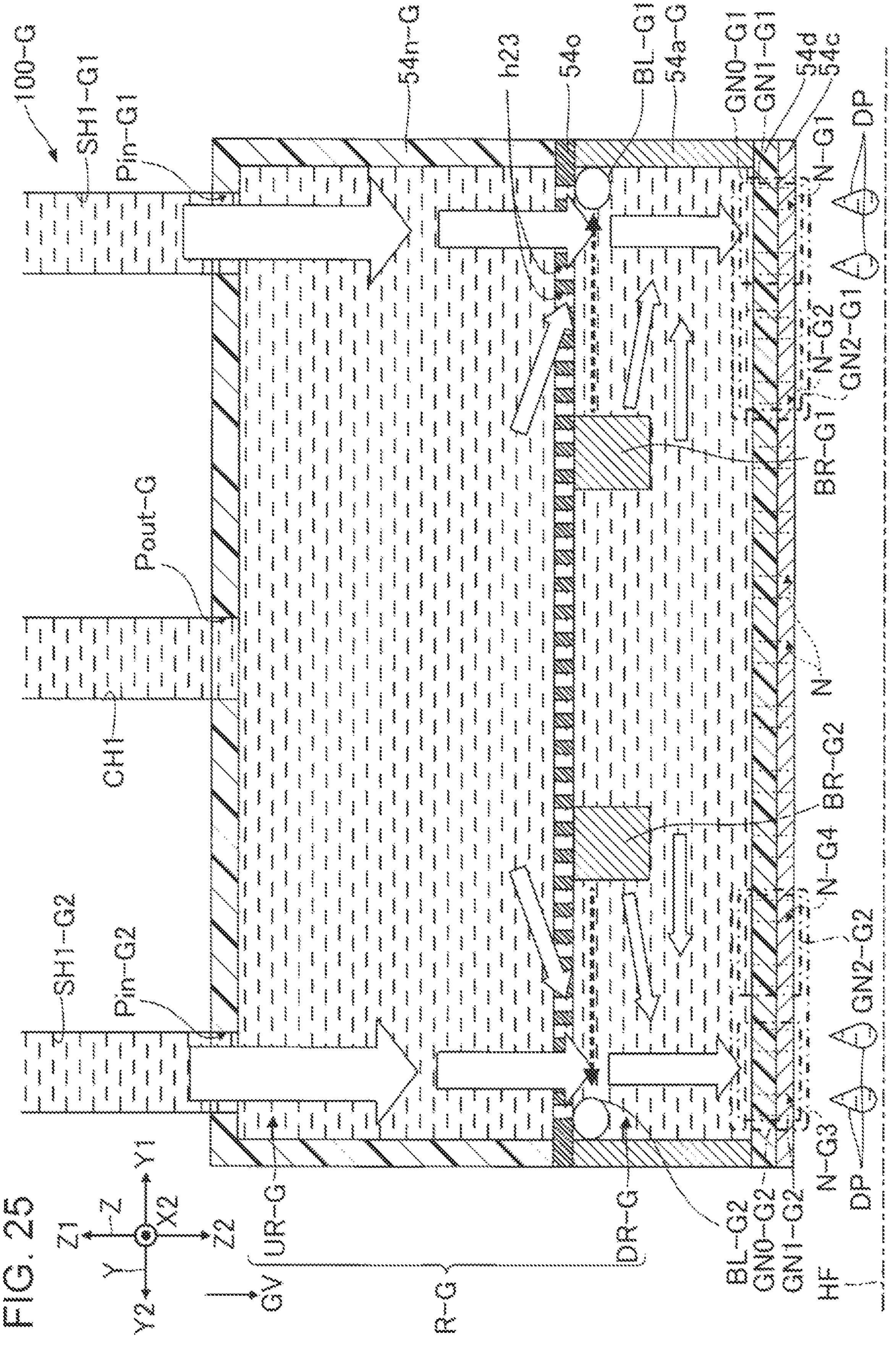
FIG. 25 is a view for describing an aspect in which the liquid ejecting apparatus performs the filling process according to the second embodiment.

FIG. 25 is a view for describing the aspect in which the liquid ejecting apparatus 100-G performs the filling process according to the second embodiment. FIG. 25 illustrates a flow of the ink inside the common liquid chamber R-G while the preliminary ejection operation is performed for the end portion nozzle group in Step S8-A.

As illustrated in FIG. 25, the liquid ejecting apparatus 100-G ejects the ink that does not directly contribute to the image formation from the plurality of nozzles N belonging to the end portion nozzle group GN1-G1 and the end portion nozzle group GN1-G2 in the plurality of nozzles N.

The end portion nozzle group GN1-G1 and the non-ejection nozzle group GN2-G1 illustrated in FIG. 25 are nozzle groups obtained by dividing the nozzle group GN0-G1 illustrated in FIG. 25 into two nozzle groups. When viewed in the direction along the Z-axis, the nozzle group GN0-G1 is a nozzle group disposed closer to the inlet Pin-G1 than the beam portion BR-G1 in all of the plurality of nozzles N belonging to the nozzle row Ln of the head chip 54 according to the fifth modification example. The end portion nozzle group GN1-G1 includes a nozzle N-G1 disposed closest to the inlet Pin in the nozzle group GN0-G1. The non-ejection nozzle group GN2-G1 includes a nozzle N-G2 disposed closest to the beam portion BR-G1 in the nozzle group GN0-G1.

The end portion nozzle group GN1-G2 and the non-ejection nozzle group GN2-G2 illustrated in FIG. 25 are nozzle groups obtained by dividing the nozzle group GN0-G2 illustrated in FIG. 25 into two nozzle groups. When viewed in the direction along the Z-axis, the nozzle group GN0-G2 is a nozzle group disposed closer to the inlet Pin-G2 than the beam portion BR-G2 in all of the plurality of nozzles N belonging to the nozzle row Ln of the head chip 54 according to the fifth modification example. The end portion nozzle group GN1-G2 includes a nozzle N-G3 disposed closest to the inlet Pin in the nozzle group GN0-

G2. The non-ejection nozzle group GN2-G2 includes a nozzle N-G4 disposed closest to the beam portion BR-G2 in the nozzle group GN0-G2.

The control module 20 supplies the drive signal Com having the same content as the drive signal Com at the time of the flushing operation to the piezoelectric elements 54*f* corresponding to each of the plurality of nozzles N belonging to the end portion nozzle group GN1-G1 and the end portion nozzle group GN1-G2, and supplies the drive signal Com having a constant potential to the piezoelectric element 54*f* corresponding to each of the nozzles N that do not belong to the end portion nozzle group GN1-G1 or the end portion nozzle group GN1-G2. The nozzle N that does not belong to the end portion nozzle group GN1-G1 or the end portion nozzle group GN1-G2 includes the nozzle N belonging to the non-ejection nozzle group GN2-G1 and the non-ejection nozzle group GN2-G2.

The end portion of the downstream chamber DR-G in the Y1-direction has a negative pressure by ejecting the ink from the plurality of nozzles N belonging to the end portion nozzle group GN1-G1. Therefore, the ink inside the downstream chamber DR-G can be moved in the Y1-direction. The air bubbles BL-G1 are also moved to the end portion of the downstream chamber DR-G in the Y1-direction in accordance with the flow of the ink in the Y1-direction.

Furthermore, since the ink is ejected from the plurality of nozzles N belonging to the end portion nozzle group GN1-G2, the end portion of the downstream chamber DR-G in the Y2-direction has the negative pressure. Therefore, the ink inside the downstream chamber DR-G can be moved in the Y2-direction. The air bubbles BL-G2 are also moved to the end portion of the downstream chamber DR-G in the Y2-direction in accordance with the flow of the ink in the Y2-direction.

After Step S8-A is completed, the liquid ejecting apparatus 100-G performs the second pressurization discharge operation in Step S10. In this manner, the air bubbles BL-G1 and the air bubbles BL-G2 can be moved in the Z2-direction, and can be discharged from the downstream chamber DR-G.

In the above-described aspect, since the ink is discharged from the plurality of nozzles N belonging to the end portion nozzle group GN1-G1 and the end portion nozzle group GN1-G2, the end portion of the downstream chamber DR-G in the Y2-direction has the negative pressure. Therefore, there is a possibility that the movement of the air bubbles BL-G1 in the Y1-direction may be hindered. Therefore, in Step S8-A, the control module 20 may supply the drive signal Com having the same content as the drive signal Com at the time of the flushing operation to the piezoelectric elements 54*f* corresponding to each of the plurality of nozzles N belonging to the end portion nozzle group GN1-G1, and the control module 20 may supply the drive signal Com having a constant potential to the piezoelectric element 54*f* corresponding to each of the nozzles N that do not belong to the end portion nozzle group GN1-G1. The liquid ejecting apparatus 100-G performs the pressurization discharge operation, and thereafter, the control module 20 supplies the drive signal Com having the same content as the drive signal Com at the time of the flushing operation to the piezoelectric elements 54*f* corresponding to each of the plurality of nozzles N belonging to the end portion nozzle group GN1-G2, and supplies the drive signal Com having a constant potential to the piezoelectric element 54*f* corresponding to each of the nozzles N that do not belong to the end portion nozzle group GN1-G2. Thereafter, the pressurization discharge operation is performed.

Although not illustrated, even when the liquid ejecting apparatus 100-G according to the fifth modification example performs the filling process according to the third embodiment, the air bubbles BL-G1 and the air bubbles BL-G2 can be discharged from the downstream chamber DR-G.

4-6. Sixth Modification Example

In the fifth modification example, two inlets Pin are provided for one common liquid chamber R, and one outlet Pout is provided for one common liquid chamber R, but the present disclosure is not limited thereto.

Figure 26:
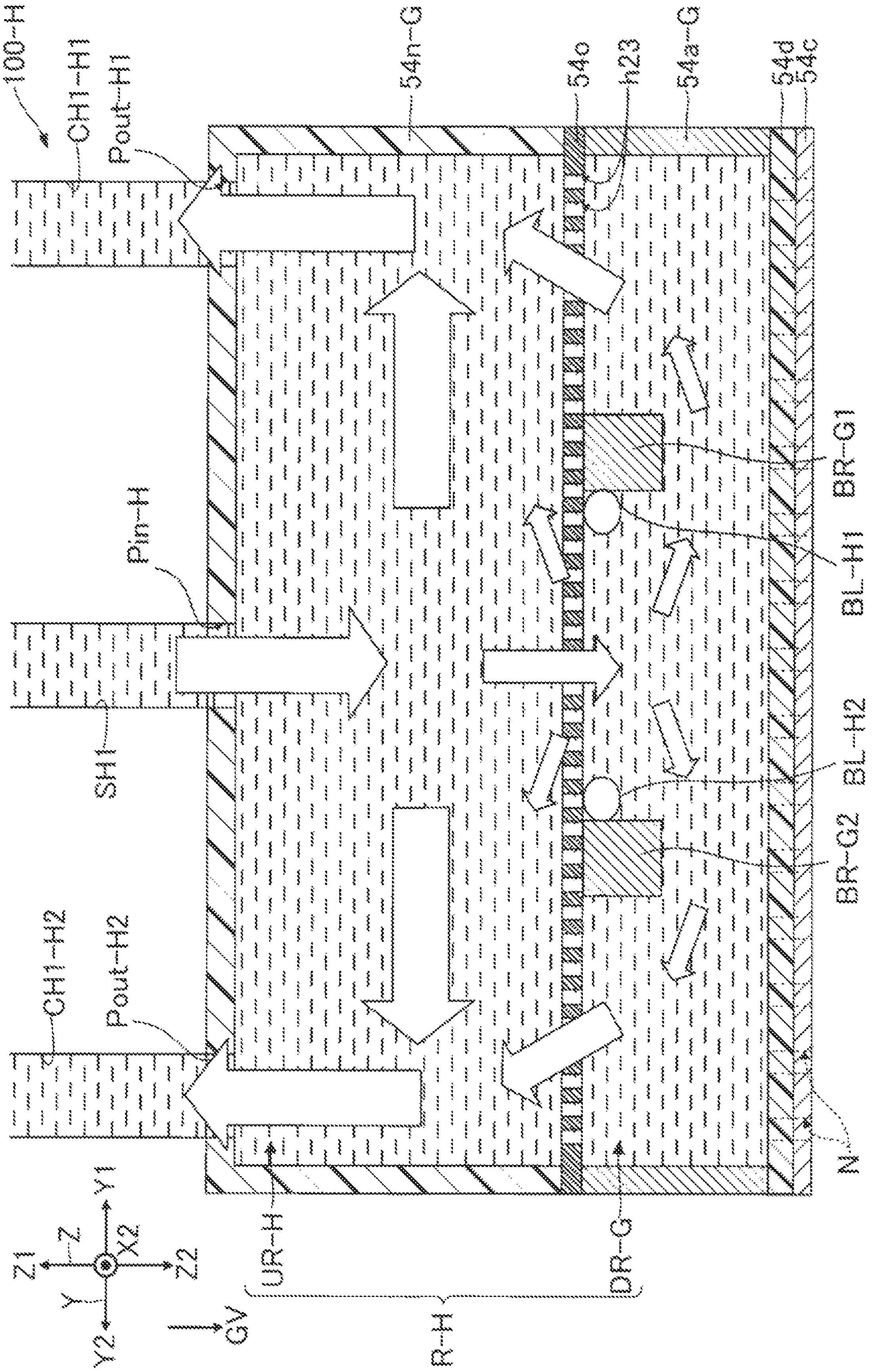
FIG. 26 is a view for describing a liquid ejecting apparatus according to a sixth modification example.

FIG. 26 is a view for describing a liquid ejecting apparatus 100-H according to a sixth modification example. The liquid ejecting apparatus 100-H is different from the liquid ejecting apparatus 100-G in that one inlet Pin-H is provided for a common liquid chamber R-H according to the sixth modification example, and an outlet Pout-H1 and an outlet Pout-H2 are provided. Hereinafter, in some cases, the outlet Pout-H1 and the outlet Pout-H2 may be collectively referred to as an outlet Pout-H. A shape of the head chip 54 according to the sixth modification example is the same as a shape of the head chip 54 according to the fifth modification example. In the sixth modification example, the common liquid chamber R-H is formed by the case 54*n*-G and the flow path forming member 54*a*-G. The common liquid chamber R-H is different from the common liquid chamber R-G in that an upstream chamber UR-H is provided instead of the upstream chamber UR-G.

In the upstream chamber UR-H, an opening that functions as the inlet Pin-G1 functions as an outlet Pout-H1 in the upstream chamber UR-G, an opening that functions as the inlet Pin-G2 functions as an outlet Pout-H2 in the upstream chamber UR-G, and an opening that functions as the outlet Pout-G functions as an inlet Pin-H in the upstream chamber UR-G.

As illustrated in FIG. 26, the outlet Pout-H1 is coupled to the in-head recovery flow path CH1-H1, and the outlet Pout-H2 is coupled to the in-head recovery flow path CH1-H2. The in-head recovery flow path CH1-H1 and the in-head recovery flow path CH1-H2 are flow paths inside the liquid ejecting head 50 according to the sixth modification example, and are flow paths provided instead of the in-head recovery flow path CH1. Each of the in-head recovery flow path CH1-H1 and the in-head recovery flow path CH1-H2 is coupled to a mainstream portion coupled to the head outlet Qout. The inlet Pin-H is coupled to the in-head supply flow path SH1.

In the sixth modification example, the liquid ejecting apparatus 100-H performs the filling process according to the first embodiment illustrated in FIG. 10. The ink is caused to flow from the inlet Pin-H to each outlet Pout-H by the first circulation operation.

Therefore, the ink supplied from the inlet Pin-H provided at the center of the upstream chamber UR-H in the direction along the Y-axis is discharged from the outlets Pout-H provided in each of both end portions of the upstream chamber UR-H in the direction along the Y-axis.

Furthermore, in the ink supplied from the inlet Pin-H, the ink flowing into the downstream chamber DR-G via the filter 54*o* is also discharged from the outlet Pout-H in each of both end portions of the downstream chamber DR-G via the upstream chamber UR-H.

As illustrated in FIG. 26, there is a possibility that the air bubbles BL-H1 and the air bubbles BL-H2 may stay due to the first circulation operation. The air bubbles BL-H1 are located in the Y2-direction with respect to the beam portion BR-H1, and are pinched between the beam portion BR-G1 and the filter 54*o*. The air bubbles BL-H2 are located in the Y1-direction with respect to the beam portion BR-H2, and are pinched between the beam portion BR-G2 and the filter 54*o*.

The liquid ejecting apparatus 100-H performs the preliminary ejection operation according to the first embodiment after the first circulation operation. In this manner, the air bubbles BL-H1 and BL-H2 can be moved in the Z2-direction, and the air bubbles BL-H1 and BL-H2 can be discharged from the downstream chamber DR-G.

4-7. Seventh Modification Example

In each of the above-described aspects, the serial type liquid ejecting apparatus 100 in which the liquid ejecting head 50 reciprocates in the direction along the X-axis has been described as an example, but the present disclosure is not limited to this aspect. The liquid ejecting apparatus may be a line-type liquid ejecting apparatus in which the plurality of nozzles N are distributed over the entire width of the medium PP.

4-8. Eighth Modification Example

In the above-described first embodiment, the circulation mechanism 15 includes one sub tank 151, but the present disclosure is not limited to this aspect. Instead of the sub tank 151, the circulation mechanism 15 of the liquid ejecting apparatus 100 may include a supply-side tank coupled to the supply flow path SF1 and storing the ink to be supplied to the liquid ejecting head 50, a recovery-side tank coupled to the recovery flow path SC1 and storing the ink recovered from the liquid ejecting head 50, a pressurization section that pressurizes the inside of the supply-side tank, a decompression section that decompresses the inside of the recovery-side tank, a relay flow path that causes the supply-side tank to communicate with the recovery-side tank, and a relay pump provided in an intermediate portion of the relay flow path and moving the ink from the recovery-side tank to the supply-side tank via the relay flow path. For example, the pressurization section is a compressor. For example, the decompression section is a vacuum pump. In the circulation mechanism 15 configured in this way, the supply-side tank is set to the positive pressure by driving the pressurization section, the recovery-side tank is set to the negative pressure by driving the decompression section, and the relay pump is driven. In this manner, the first circulation operation can be performed to circulate the ink in order of the supply-side tank, the supply flow path SF1, the head chip 54, the recovery flow path SC1, the recovery-side tank, the relay flow path, and the supply-side tank. In addition, in this configuration, the pressurization discharge operation may be performed in such a manner that the supply flow path SF1 is pressurized by the pressurization section instead of the pump 159. In the present modification example, the supply-side tank and the recovery-side tank are examples of a "liquid storage section".

4-9. Ninth Modification Example

The above-described liquid ejecting apparatus may be a 3D printer for three-dimensional modeling which ejects a photocurable resin liquid as a liquid by using an ink jet method to form a three-dimensional object. In this case, an operation for ejecting the liquid that does not form the three-dimensional object itself is an example of the preliminary ejection operation.

4-10. Other Modification Examples

The liquid ejecting apparatus described above can be adopted in various equipment such as a facsimile machine and a copier, in addition to a device dedicated to printing. However, an application of the liquid ejecting apparatus of the embodiments of the present disclosure is not limited to the printing. For example, the liquid ejecting apparatus for ejecting a solution of a coloring material is used as a manufacturing apparatus for forming a color filter of a liquid crystal display device. In addition, a liquid ejecting apparatus that ejects a solution of a conductive material is used as a manufacturing apparatus forming wiring and electrodes of a wiring substrate.

What is claimed is:

1. A liquid ejecting apparatus comprising:
- a plurality of nozzles configured to eject a liquid in an ejection direction;
- a common liquid chamber that communicates with the plurality of nozzles and extends in a first direction orthogonal to the ejection direction;
- a filter that partitions the common liquid chamber into an upstream chamber and a downstream chamber;
- an inlet for introducing the liquid into the upstream chamber;
- an outlet for causing the liquid to flow out from the upstream chamber;
- a liquid storage tank configured to store the liquid;
- a supply flow path that causes the inlet to communicate with the liquid storage tank;
- a recovery flow path that causes the outlet to communicate with the liquid storage tank;
- a beam that couples a pair of inner walls for defining the downstream chamber and is provided inside the downstream chamber, the pair of inner walls being separated in a second direction intersecting with the first direction when viewed in the ejection direction; and
- a processor configured to be programed to:
  - perform a filling operation in which the liquid is filled in a circulation path, the circulation path including the liquid storage tank, the supply flow path, the common liquid chamber, and the recovery flow path;
  - perform a first circulation operation in which the liquid is circulated in the circulation path;
  - perform a pressurization discharge operation in which the liquid is discharged from the plurality of nozzles by pressurizing the supply flow path; and
  - perform a predetermined operation in which the liquid moves inside the downstream chamber in a direction different from a direction in which the liquid inside the downstream chamber is moved by the first circulation operation,
- wherein the processor is configured to, in the filling operation,
  - perform the predetermined operation after the first circulation operation is performed; and
  - perform the pressurization discharge operation after predetermined operation is performed.

2. The liquid ejecting apparatus according to claim 1, wherein
- in the filling process, the pressurization discharge operation is also performed between the first circulation operation and the predetermined operation, and the predetermined operation is a preliminary ejection operation for ejecting the liquid from all or a part of the plurality of nozzles.

3. The liquid ejecting apparatus according to claim 2, wherein in the preliminary ejection operation as the predetermined operation, the liquid is ejected from all of the plurality of nozzles.

4. The liquid ejecting apparatus according to claim 2, wherein the plurality of nozzles are arranged in the first direction to form a nozzle row, the inlet is disposed in an end portion of the upstream chamber in the first direction, when viewed in the ejection direction, a nozzle group disposed closer to the inlet than the beam portion in the plurality of nozzles is divided into a first nozzle group including the nozzle disposed closest to the inlet in the nozzle group and a second nozzle group including the nozzle disposed closest to the beam portion in the nozzle group, and in the preliminary ejection operation as the predetermined operation, the liquid is ejected from the plurality of nozzles belonging to the first nozzle group.

5. The liquid ejecting apparatus according to claim 2, wherein in the filling process, the amount of the liquid discharged from the plurality of nozzles by the pressurization discharge operation performed after the predetermined operation is smaller than the amount of the liquid discharged from the plurality of nozzles by the pressurization discharge operation performed between the first circulation operation and the predetermined operation.

6. The liquid ejecting apparatus according to claim 1, wherein the predetermined operation is a second circulation operation for circulating the liquid in a direction opposite to a direction in which the liquid is moved by the first circulation operation.

7. The liquid ejecting apparatus according to claim 6, wherein in the filling process, a period during which the second circulation operation is performed is shorter than a period during which the first circulation operation is performed.

* * * * *